(12) United States Patent
Kwak et al.

(10) Patent No.: US 12,493,320 B2
(45) Date of Patent: Dec. 9, 2025

(54) SLIDEABLE ELECTRONIC DEVICE

(71) Applicant: Samsung Electronics Co., Ltd., Suwon-si (KR)

(72) Inventors: Doyoung Kwak, Suwon-si (KR); Soohyun Park, Suwon-si (KR); Minwoo Yoo, Suwon-si (KR); Yongsang Yun, Suwon-si (KR); Youngmin Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 18/328,409

(22) Filed: Jun. 2, 2023

(65) Prior Publication Data
US 2023/0315147 A1    Oct. 5, 2023

Related U.S. Application Data

(63) Continuation of application No. PCT/KR2021/018377, filed on Dec. 6, 2021.

(30) Foreign Application Priority Data

Dec. 4, 2020 (KR) ............... 10-2020-0167995
May 13, 2021 (KR) ............... 10-2021-0062067

(51) Int. Cl.
*G06F 1/16* (2006.01)

(52) U.S. Cl.
CPC ......... *G06F 1/1624* (2013.01); *G06F 1/1652* (2013.01); *G06F 1/1679* (2013.01); *G06F 1/1681* (2013.01)

(58) Field of Classification Search
CPC .... G06F 1/1624; G06F 1/1652; G06F 1/1679; G06F 1/1681; H04M 1/0237; H04M 1/0268; G09F 9/301

(Continued)

(56) References Cited

U.S. PATENT DOCUMENTS 9,519,313 B2 * 12/2016 Kim .................... G06F 1/166
10,025,355 B2     7/2018 Bohn et al.
(Continued)

FOREIGN PATENT DOCUMENTS

CN    106030687 A * 10/2016   ........... H05K 1/0281
CN    111819615 A    10/2020
(Continued)

OTHER PUBLICATIONS

International Search Report dated Mar. 3, 2022, issued in an International Application No. PCT/KR2021/018377.
(Continued)

*Primary Examiner* — Mahendra R Patel
(74) *Attorney, Agent, or Firm* — Jefferson IP Law, LLP

(57) ABSTRACT

A slidable electronic device having a side-surface protruding/retracting structure is provided. The electronic device includes a first housing, a second housing slidably coupled to the first housing, a flexible display panel located between the first housing and the second housing, a protruding/retracting member protruding between side-surface portions of the first housing and the second housing, formed on the side surface of the flexible display panel, or is recessed from the space to the inside of the electronic device, an interlocking structure that changes the sliding operation to a side-surface directional movement of the electronic device, a flexible connection member which has one end coupled to one end of the protruding/retracting member and the other end connected to the interlocking structure, and a guide which changes, to vertical movement, the side-surface directional movement of the connection member, generated by the action of the interlocking structure.

14 Claims, 28 Drawing Sheets

(58) Field of Classification Search
USPC .................................................. 455/575.4
See application file for complete search history.

(56) References Cited

U.S. PATENT DOCUMENTS

| | | | |
|---|---|---|---|
| 10,321,583 B2 | 6/2019 | Seo et al. | |
| 10,684,652 B2 | 6/2020 | Kim et al. | |
| 11,226,655 B2 * | 1/2022 | Shim | G06F 3/0482 |
| 11,910,549 B2 * | 2/2024 | Ko | G06F 1/1624 |
| 11,914,423 B2 * | 2/2024 | Shin | H04M 1/0268 |
| 12,063,754 B2 * | 8/2024 | Chun | H05K 5/0217 |
| 12,267,451 B2 * | 4/2025 | Jeon | H04M 1/035 |
| 12,307,934 B2 * | 5/2025 | Kim | G06F 1/1624 |
| 2005/0052833 A1 * | 3/2005 | Tanaka | G06F 1/1683 361/679.21 |
| 2010/0177020 A1 * | 7/2010 | Bemelmans | G09F 9/00 345/55 |
| 2012/0162876 A1 | 6/2012 | Kim | |
| 2013/0058063 A1 * | 3/2013 | O'Brien | G06F 1/1624 361/807 |
| 2013/0120912 A1 * | 5/2013 | Ladouceur | G06F 1/1616 361/679.01 |
| 2014/0380186 A1 * | 12/2014 | Kim | G06F 1/1677 715/746 |
| 2016/0147261 A1 * | 5/2016 | Bohn | H10K 50/84 455/566 |
| 2017/0139442 A1 * | 5/2017 | Yoshizumi | G06F 1/1641 |
| 2017/0364119 A1 * | 12/2017 | Lee | G06F 1/1652 |
| 2018/0103550 A1 * | 4/2018 | Seo | G06F 1/1601 |
| 2019/0261519 A1 * | 8/2019 | Park | H04M 1/0235 |
| 2020/0264660 A1 | 8/2020 | Song et al. | |
| 2020/0267246 A1 * | 8/2020 | Song | H05K 1/148 |
| 2020/0304613 A1 * | 9/2020 | Cha | G06F 1/1652 |
| 2020/0329572 A1 * | 10/2020 | Wittenberg | H10K 59/12 |
| 2021/0219437 A1 | 7/2021 | Kim et al. | |

FOREIGN PATENT DOCUMENTS

| | | | |
|---|---|---|---|
| EP | 2469808 A2 * | 6/2012 | .......... H04M 1/0268 |
| EP | 3791379 B1 * | 1/2025 | .......... H04M 1/0268 |
| JP | 2017-097345 A | 6/2017 | |
| KR | 10-2012-0079493 A | 7/2012 | |
| KR | 10-2017-0141438 A | 12/2017 | |
| KR | 10-2019-0004618 A | 1/2019 | |
| KR | 10-1993390 B1 | 6/2019 | |
| KR | 10-2019-0101184 A | 8/2019 | |
| KR | 10-2019-0143029 A | 12/2019 | |
| KR | 20200066280 A * | 6/2020 | .......... G02B 27/0176 |
| KR | 10-2020-0111083 A | 9/2020 | |
| KR | 10-2154933 B1 | 9/2020 | |
| WO | 2019/153256 A1 | 8/2019 | |

OTHER PUBLICATIONS

Korean Notice of Allowance dated Oct. 15, 2025, issued in Korean Application No. 10-2021-0062067.

* cited by examiner

SLIDEABLE ELECTRONIC DEVICE

CROSS-REFERENCE TO RELATED APPLICATION(S)

This application is a continuation application, claiming priority under § 365(c), of an International application No. PCT/KR2021/018377, filed on Dec. 6, 2021, which is based on and claims the benefit of a Korean patent application number 10-2020-0167995, filed on Dec. 4, 2020, in the Korean Intellectual Property Office, and a of Korean patent application number 10-2021-0062067, filed on May 13, 2021, in the Korean Intellectual Property Office, the disclosure of each of which is incorporated by reference herein in its entirety.

BACKGROUND

1. Field

The disclosure relates to an electronic device. More particularly, the disclosure relates to a slideable electronic device having a side protruding and retracting structure.

2. Description of Related Art

In an electronic device, particularly, a portable electronic device, a large-area display is advantageous for utilization of digital contents, but it may be advantageous for the electronic device to have a small form-factor for ease of portability and use. With the advent of flexible displays using technology, such as organic light-emitting diodes (OLED), rollable or slideable electronic devices that mount flexible displays so as to mount large-area displays in small form-factors may be utilized.

The above information is presented as background information only to assist with an understanding of the disclosure. No determination has been made, and no assertion is made, as to whether any of the above might be applicable as prior art with regard to the disclosure.

SUMMARY

Conventionally, a double housing structure in which a protruding and retracting portion of a flexible display panel is protected by an inner housing and in which the inner housing is protruded from and retracting into an outer housing may be utilized. However, in the conventional double housing structure, because a display between the outer housing and the inner housing should receive the inner housing, it may be difficult to reduce a thickness of the bezel.

A slideable electronic device may have a structure in which a flexible display panel is protruded from and retracted into a main body. In the case that the flexible display panel of the slideable electronic device is drawn out, a side surface of the flexible display panel may be exposed. Accordingly, the exposed side surface of the flexible display panel may be damaged due to an external impact, or a foreign material may be introduced into the slideable electronic device through an exposed portion.

Aspects of the disclosure are to address at least the above-mentioned problems and/or disadvantages and to provide at least the advantages described below. Accordingly, an aspect of the disclosure is to provide a slideable electronic device in which a side surface of a flexible display panel is protected and in which a thickness of a bezel is reduced and in which a sense of unity in appearance is maintained.

Another aspect of the disclosure is to provide a slideable electronic device in which a transmission and reception performance is improved by exposing a wireless transceiver.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing slidably coupled to the first housing, a flexible display panel retracted into and drawn out from the electronic device by a sliding motion between the first housing and the second housing, a protruding and retracting member protruded to a space between lateral portions of the first housing and the second housing generated at a side surface of the flexible display panel or retracted into the electronic device from the space when the flexible display panel is drawn out or retracted, an interlocking structure coupled to at least one of the first housing or the second housing and configured to convert the sliding motion into a lateral movement of the electronic device, a connecting member having flexibility configured such that one end thereof is coupled to one end of the protruding and retracting member and another end thereof is connected to the interlocking structure to be movable along the lateral movement, and a guide positioned in at least one of the first housing or the second housing and configured to convert the lateral movement of the connecting member generated by an action of the interlocking structure into a vertical movement. In various embodiments of the disclosure, the interlocking structure includes a sliding rail disposed on an inner side surface of at least one of the first housing or the second housing, a sliding block having one end portion slidably coupled to the sliding rail, and at least one link bar having one end portion rotatably coupled to the other end portion of the sliding block and the other end portion rotatably connected to the connecting member.

In various embodiments of the disclosure, the sliding rail includes a groove formed on an inner side surface of the first housing, and the guide may be fixedly disposed at the second housing in a lateral portion exposed to the outside during the withdrawing operation of the second housing. In another embodiment of the disclosure, the sliding rail includes a groove formed on an inner side surface of the second housing, and the guide may be fixedly disposed at the first housing at a lateral portion exposed to the outside during the withdrawing operation of the first housing. In another embodiment of the disclosure, the sliding rail includes a first sliding rail including a first groove formed on an inner side surface of the first housing and a second sliding rail including a second groove formed on an inner side surface of the second housing, the sliding block includes a first sliding block slidably coupled to the first sliding rail and a second sliding block slidably coupled to the second sliding rail, the link bar includes a first link bar having one end portion rotatably coupled to the other end portion of the first sliding block and the other end portion rotatably connected to the other end portion of the connecting member and a second link bar having one end portion rotatably coupled to the other end portion of the second sliding block and the other end portion rotatably connected to the other end portion of the connecting member, wherein the first link bar and the second link may be disposed to face each other based on a center line of the connecting member.

In another embodiment of the disclosure, the electronic device further includes a foreign material blocking member in contact with a lower part of the connecting member, slidably coupled on an inner surface of the first housing or the second housing, and configured to block a gap existing between a lower part of the connecting member and an inner surface of the first housing or the second housing to prevent a foreign material from being introduced into the electronic device.

In another embodiment of the disclosure, the sliding rail includes a sliding limiting member disposed close to an end portion in a direction in which the flexible display panel is retracted on a surface thereof and configured to apply a resistance force to a sliding movement therebetween with respect to the sliding block, wherein the sliding limiting member may have an asymmetrical resistance force that provides a low resistance force to a sliding movement of the sliding block when an operation of withdrawing the flexible display panel is performed and that provides a high resistance force to the sliding movement of the sliding block in an operation of retracting the flexible display panel.

In various embodiments of the disclosure, the connecting member includes a multi-bar structure including a plurality of bars disposed in parallel with each other and rotatably connected to each other. In another embodiment of the disclosure, the connecting member may have one side disposed parallel to the bar and the other side disposed at a specific angle with the one side on a plane, and the other side may have a flat connecting member rotatably connected to the other end portion of the link bar. In another embodiment of the disclosure, the sliding block includes a groove formed in the other end portion so that the one end portion of the link bar may be rotatably fitted, and the flat connecting member includes a groove formed to be rotatably fitted with the other end portion of the link bar at a distal end portion of the other side. In another embodiment of the disclosure, the connecting member includes a plurality of guide blocks formed at one side of each of the plurality of bars, and the guide includes a guide rail slidably coupled to the plurality of guide blocks. In some embodiments of the disclosure, the plurality of guide blocks may have a T-shaped cross-section, and the guide rail may have a cross-sectional shape corresponding to a cross-sectional shape of the plurality of guide blocks.

In various embodiments of the disclosure, the protruding and retracting member may be a side wall configured to protect the side surface of the flexible display panel. In another embodiment of the disclosure, the protruding and retracting member includes or be connected to a wireless transceiver, and the wireless transceiver included in or connected to the protruding and retracting member by a sliding motion may change a position thereof inside the electronic device or be exposed to a space between the first housing and the second housing to improve a wireless reception performance.

According to various embodiments disclosed in this document, a slideable electronic device in which a protruding and retracting member is interlocked with a sliding motion to be protruded from and withdrawn to a side surface of a flexible display panel and in which the side surface of the flexible display panel is thus protected by the protruding and retracting member and that has a constant and thin bezel thickness is provided. According to various embodiments of the disclosure, as the protruding and retracting member protruding and retracting in interlocking with a sliding operation includes a wireless transceiver, a slideable electronic device having an improved radio wave transmission and reception performance can be provided.

According to various embodiments of the disclosure, by positioning a protruding and retracting member in side areas of the second housing slidably coupled to the first housing, an electronic device capable of minimizing exposure can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
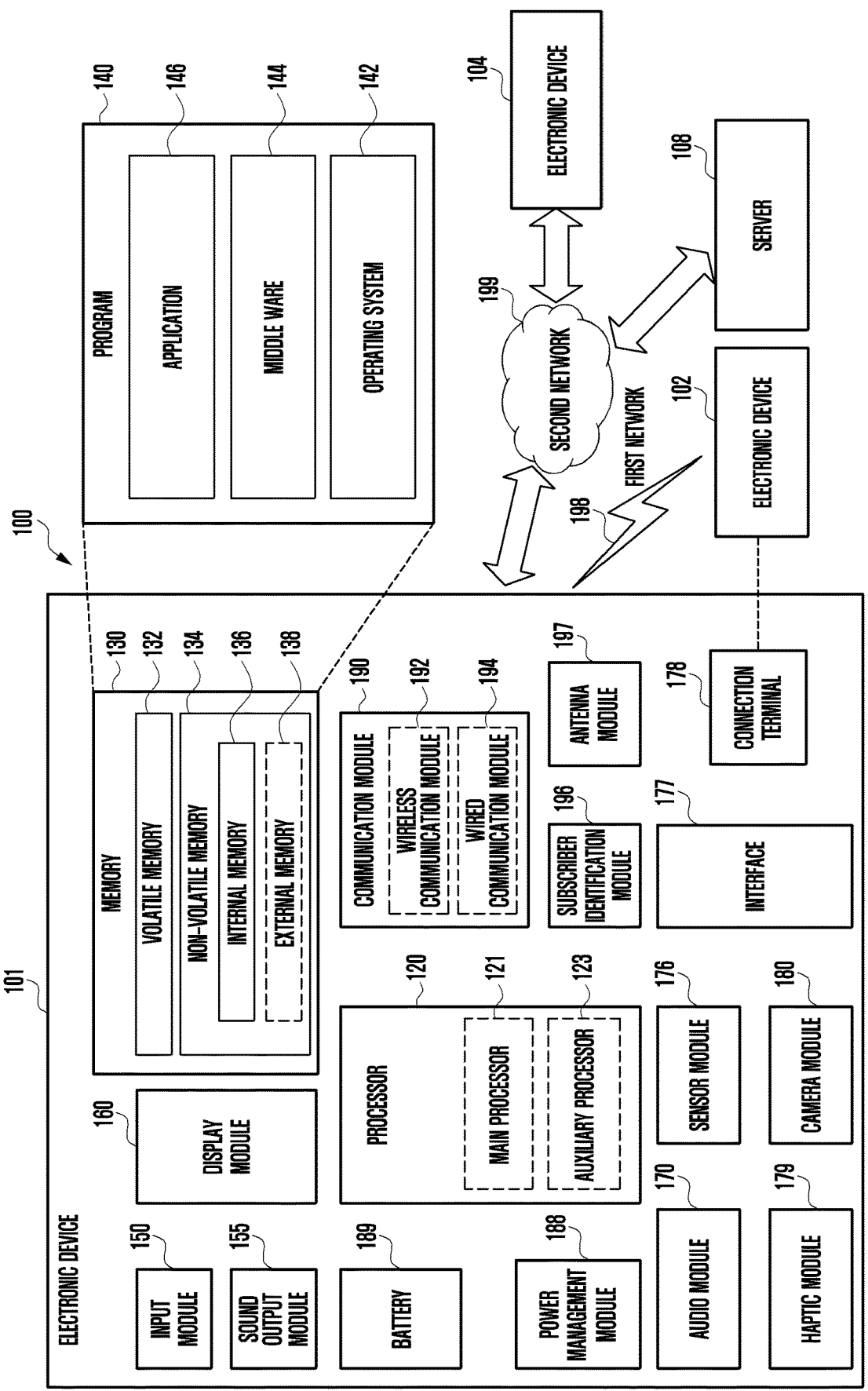
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 1190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 1121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 1121.

The auxiliary processor 123 may control at least some of functions or states related to at least one component (e.g., the display module 160, the sensor module 176, or the communication module 190) among the components of the electronic device 1101, instead of the main processor 1211 while the main processor 121 is in an inactive (e.g., a sleep) state, or together with the main processor 121 while the main processor 121 is in an active state (e.g., executing an application). According to an embodiment of the disclosure, the auxiliary processor 1123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 1176) of the electronic device 101. The various data may include, for example, software (e.g., the program 1140) and input data or output data for a command related thereto. The memory 130 may include the volatile memory 132 or the non-volatile memory 134. The non-volatile memory 134 may include an intermit memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 1101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 10). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 1011. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 1104, or the server 108) and performing communication via the established communication channel. The communication module 190 may include one or more communication processors that are operable independently from the processor 1120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 1199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 1011. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

Figure 2A:
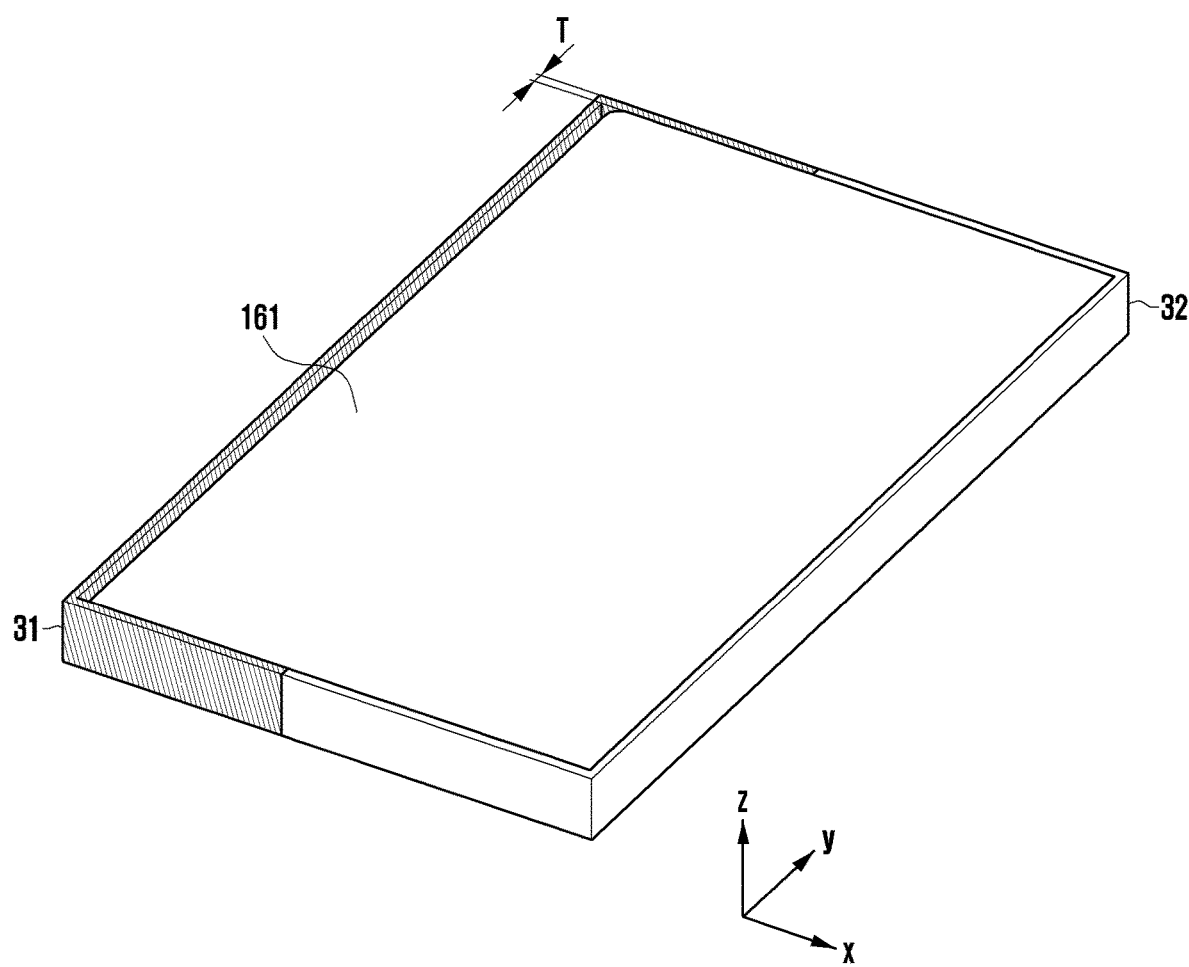
FIG. 2A is a perspective view illustrating a front surface of an electronic device in a state in which a flexible display panel of the electronic device is retracted according to an embodiment of the disclosure.

FIG. 2A is a perspective view illustrating a front surface of an electronic device 101 in a state in which a flexible display panel 161 of the electronic device 101 is retracted according to an embodiment of the disclosure.

Figure 2B:
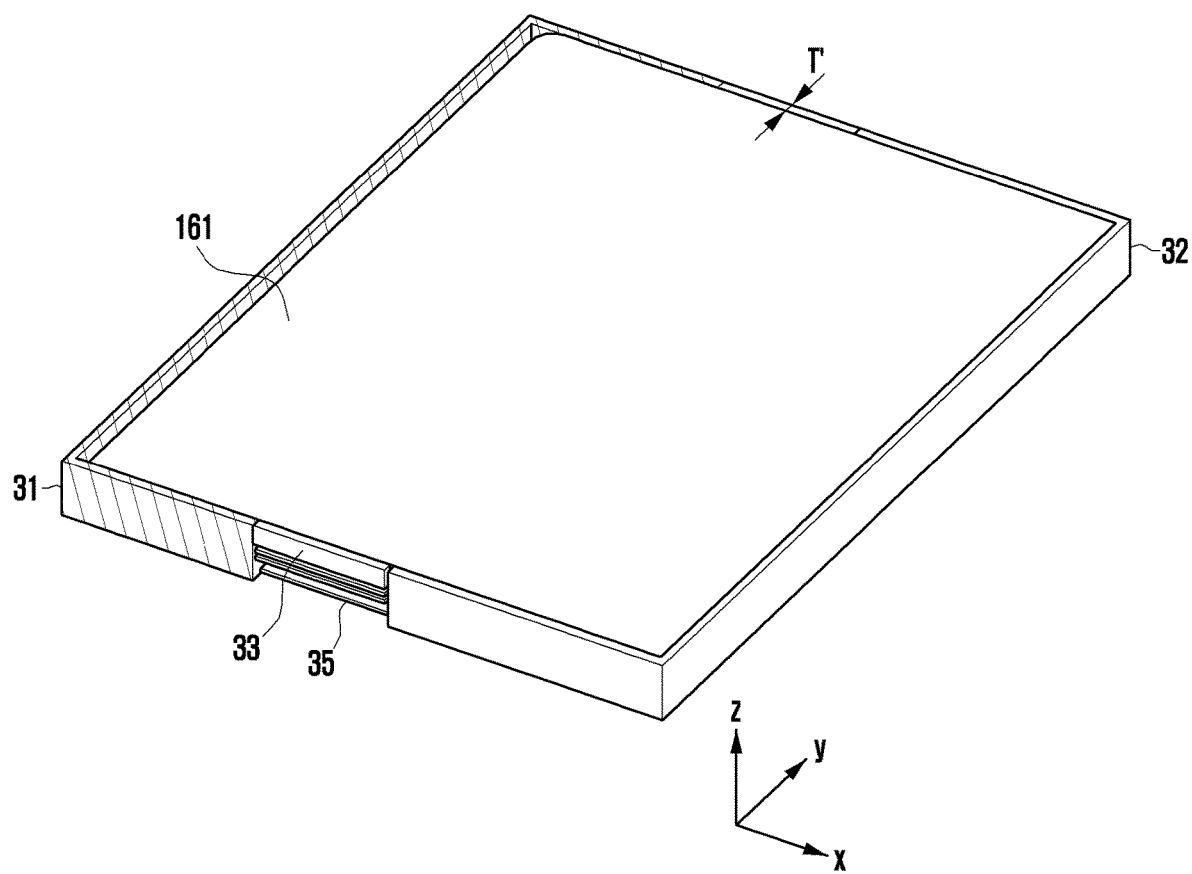
FIG. 2B is a perspective view illustrating a front surface of an electronic device in a state in which a flexible display panel of the electronic device is drawn out according to an embodiment of the disclosure.

FIG. 2B is a perspective view illustrating a front surface of the electronic device 101 in a state in which the flexible display panel 161 of the electronic device 101 is drawn out according to an embodiment of the disclosure.

Figure 2C:
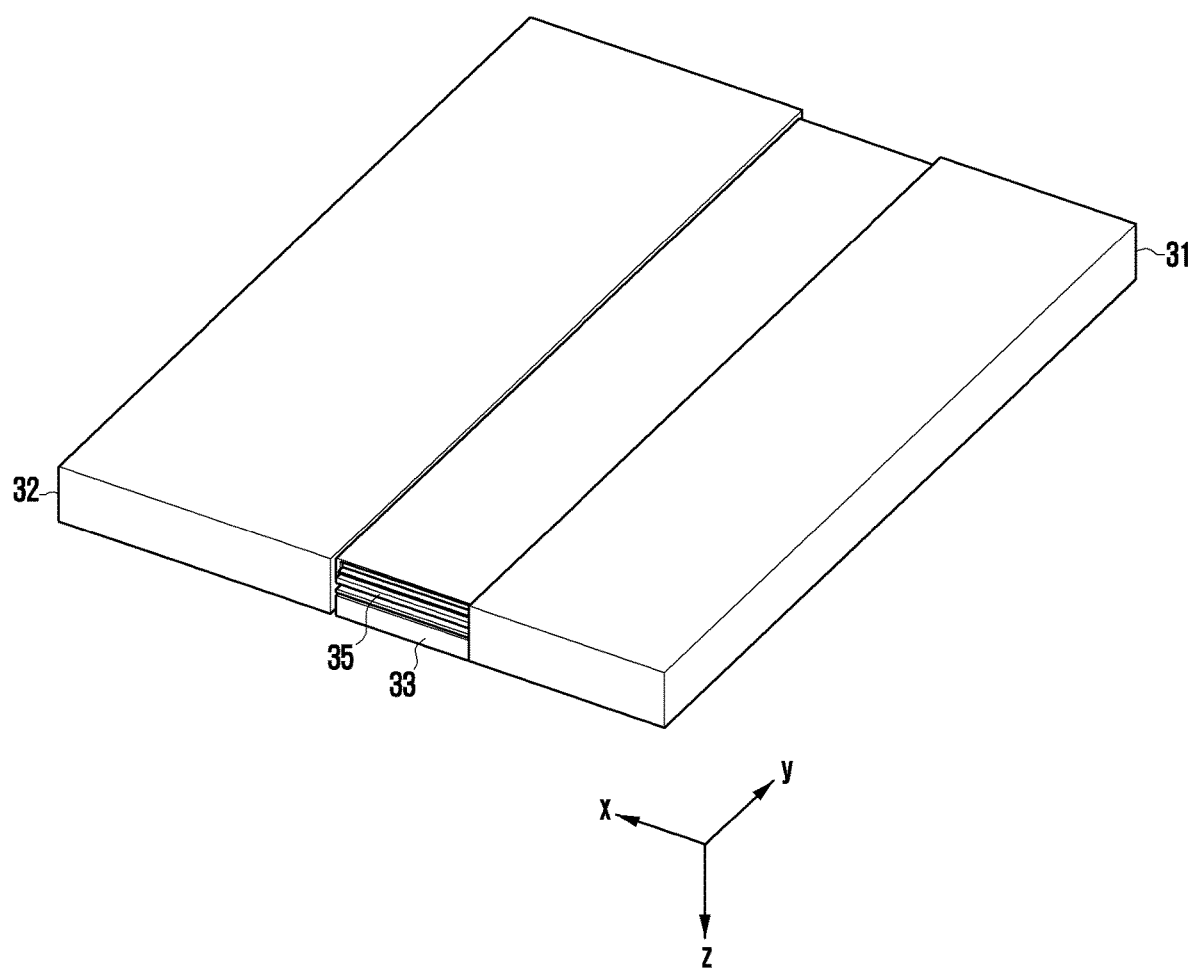
FIG. 2C is a perspective view illustrating a rear surface of an electronic device in a state in which a flexible display panel of the electronic device is drawn out according to an embodiment of the disclosure.

FIG. 2C is a perspective view illustrating a rear surface of the electronic device 101 in a state in which the flexible display panel 161 of the electronic device 101 is drawn out according to an embodiment of the disclosure.

Figure 2D:
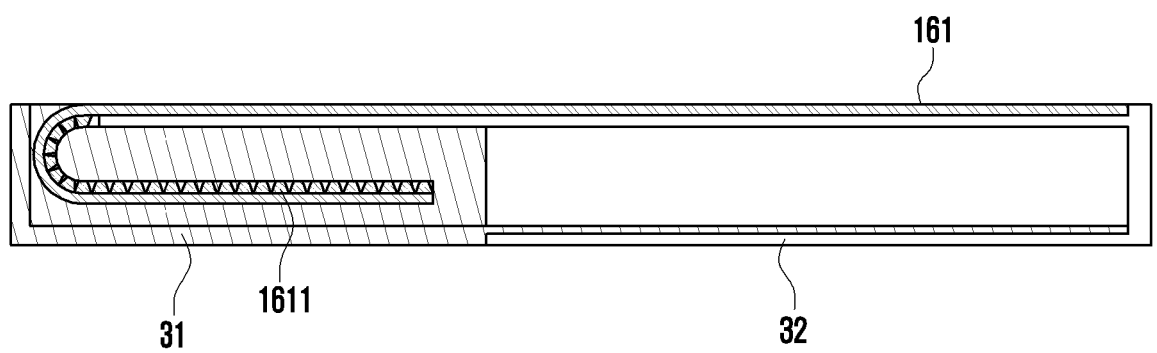
FIG. 2D is a cross-sectional view illustrating an inside of an electronic device in a state in which a flexible display panel of the electronic device is retracted according to an embodiment of the disclosure.

FIG. 2D is a cross-sectional view illustrating the inside of the electronic device 101 in a state in which the flexible display panel 161 of the electronic device 101 is retracted according to an embodiment of the disclosure.

Referring to FIGS. 2A to 2C, x, y, and z coordinate axes are represented, and the term "horizontal" in this specification may refer to a plane parallel to the x and y axes and/or a direction parallel to the plane, the term "vertical" may refer to a direction parallel to the z-axis, and the term "side surface" may refer to a plane perpendicular to the y-axis.

Referring to FIGS. 2A and 2B, an electronic device 101 according to embodiments of the disclosure may include a first housing 31, a second housing 32, a flexible display panel 161, a protruding and retracting member 33, and a connecting member 35.

The first housing 31 and the second housing 32 may provide a space for mounting internal components of the electronic device 101, and protect the internal components from an external impact. The first housing 31 and the second housing 32 may be slidably coupled to each other in the x-axis direction on the drawing. File first housing and the second housing may include sidewalls having a constant thickness in order to protect a lateral portion of the flexible display panel 161 to be described later, and a thickness T of the sidewalls may be defined as a bezel thickness.

The flexible display panel 161 may perform an operation of being drawn out from or retracted to the inside of the first housing by a sliding motion between the first housing and the second housing. In some embodiments of the disclosure, the flexible display panel 161 may be an organic light emitting diode (OLED) display panel. The flexible display panel 161 may include a cover for protecting a thin-film transistor (TFT) and display element on a surface of the panel, and the cover may include a synthetic resin material, such as colorless polyimide or a transparent material having flexibility, such as ultra thin glass. The flexible display panel 161 may include a flexible support member 1161 that may be curved while being retracted to the first housing and for structural support at a curved portion. In some embodiments of the disclosure, the flexible support member 161 may include a multi-joint structure in which a plurality of support plates are rotatably connected.

The protruding and retracting member 33 may be positioned inside the electronic device 101 in a state in which the flexible display panel 161 is retracted and be protruded to a space existing between side surfaces of the first housing 31 and the second housing 32 when the flexible display panel 161 is drawn out. Further, when the flexible display panel 161 is retracted, the flexible display panel 161 may be retracted into the electronic device 101. A length of the protruding and retracting member 33 in the x-axis direction may be smaller than that of a gap formed between the first housing 31 and the second housing 32 in a state in which the flexible display panel 161 is drawn out. A mechanism in which the protruding and retracting member 33 is protruded and retracted will be described later.

In some embodiments of the disclosure, the protruding and retracting member 33 may be a side wall protecting a portion of the side surface of the flexible display panel 161 exposed to a space existing between side surfaces of the first housing 31 and the second housing 32 in a state in which the flexible display panel 161 is drawn out. The protruding and retracting member 33 may have substantially the same thickness T' as that of bezels of the first housing 31 and the second housing 32 in a state protruded to the side surface of the flexible display panel 161. Such a constitution can improve the sense of unity in the appearance of the electronic device 101 in a state in which the flexible display panel 161 is drawn out.

In another embodiment of the disclosure, the protruding and retracting member 33 may include a wireless transceiver 331. The wireless transceiver may be a device for inputting and outputting radio waves, infrared rays, or signals for communication similar thereto. In some embodiments of the disclosure, the wireless transceiver 331 may include an antenna module 1197. Because the protruding and retracting member 33 includes the wireless transceiver 331, the wireless transceiver 331 may be exposed to the outside, as needed, and a wireless transmission and reception performance of the electronic device 101 may be improved. In another embodiment of the disclosure, the protruding and retracting member 33 may include only a portion of the wireless transceiver 331 or may be connected to the wireless transceiver 331. In the case that the protruding and retracting member 33 moves according to a withdrawal operation of the flexible display panel 161, a position of the wireless transceiver 331 may be changed inside the electronic device 101. As the wireless transceiver 331 changes a position thereof to correspond to the change in radio wave transmission and reception characteristics of the electronic device 1101 changing according to withdrawal or retraction of the flexible display panel 161, a wireless transmission and reception performance of the electronic device 101 may maintain an optimal state.

Figure 3A:
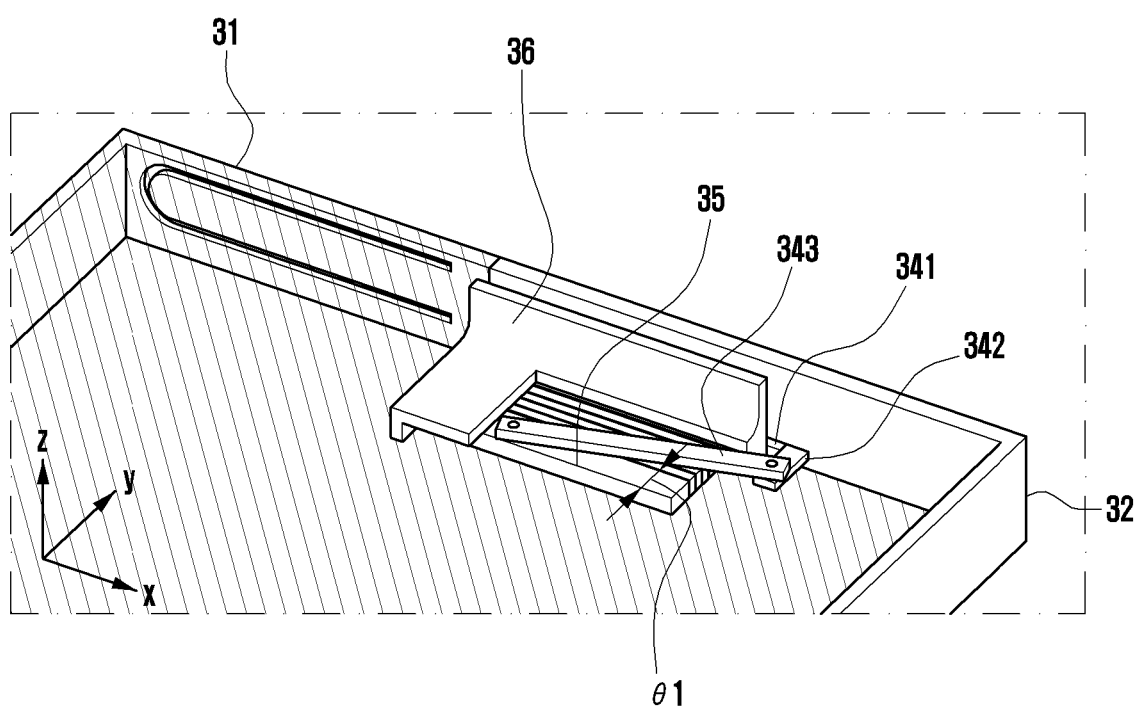
FIG. 3A is an enlarged view illustrating an internal mechanism of an electronic device in a state in which a flexible display panel of the electronic device is retracted according to an embodiment of the disclosure.

FIG. 3A is an enlarged view illustrating an internal mechanism of the electronic device 101 in a state in which the flexible display panel 161 of the electronic device 101 is retracted according to an embodiment of the disclosure.

Figure 3B:
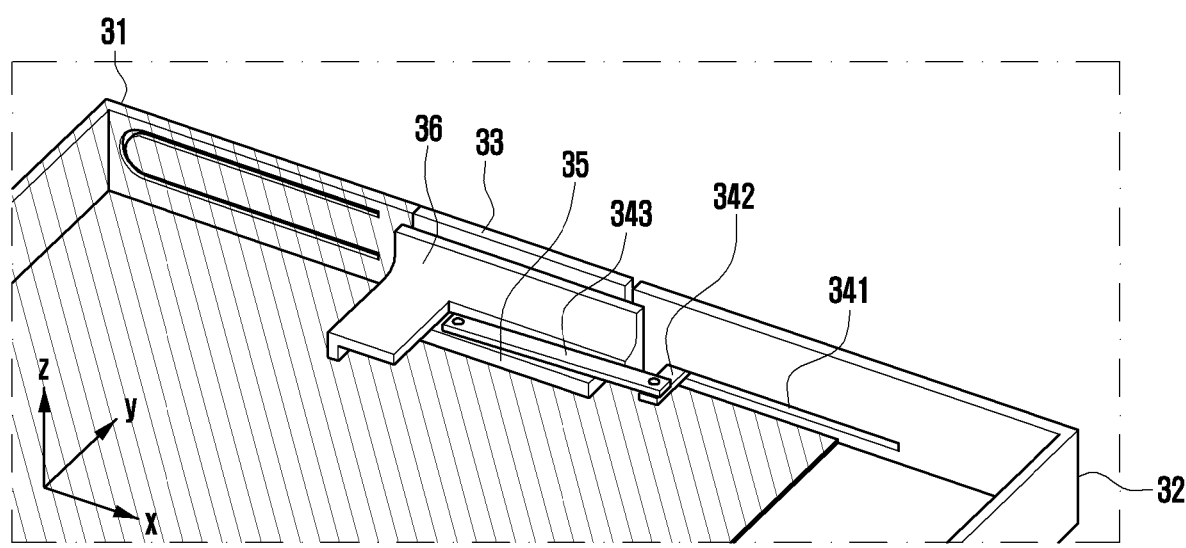
FIG. 3B is an enlarged view illustrating an internal mechanism of an electronic device in a state in which a flexible display panel of the electronic device is drawn out according to an embodiment of the disclosure.

FIG. 3B is an enlarged view illustrating an internal mechanism of the electronic device 101 in a state in which the flexible display panel 161 of the electronic device 101 is drawn out according to an embodiment of the disclosure.

Figure 3C:
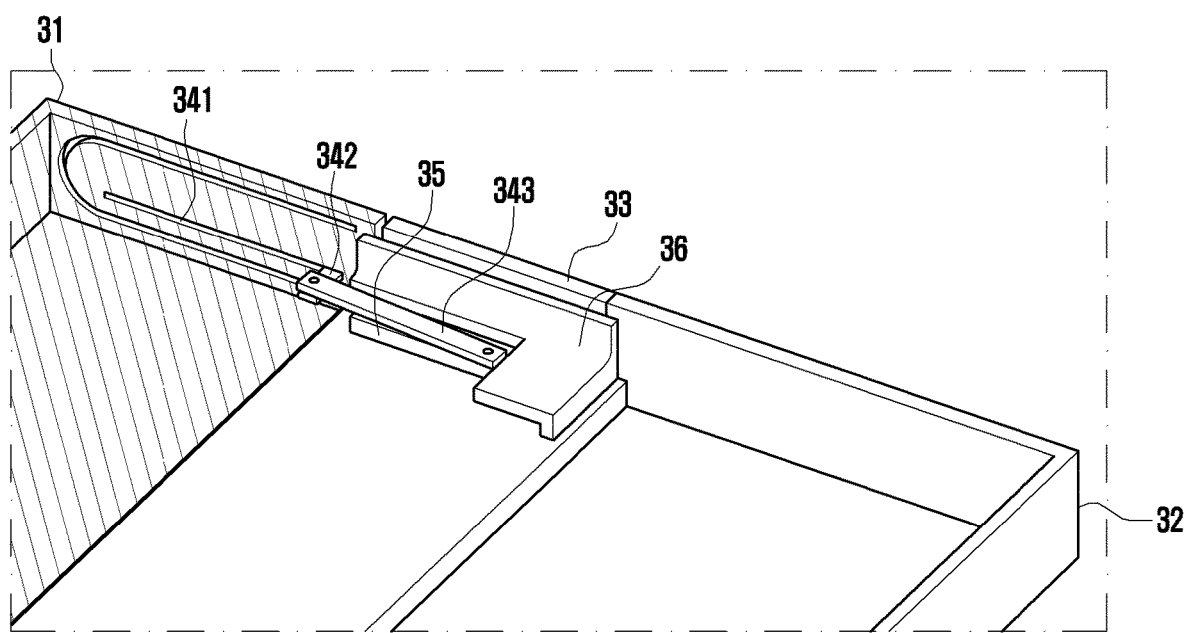
FIG. 3C is an enlarged view illustrating an internal mechanism of an electronic device in a state in which a flexible display panel of the electronic device is drawn out according to an embodiment of the disclosure.

FIG. 3C is an enlarged view illustrating an internal mechanism of the electronic device 101 in a state in which the flexible display panel 161 of the electronic device 101 is drawn out according to an embodiment of the disclosure.

Figure 3D:
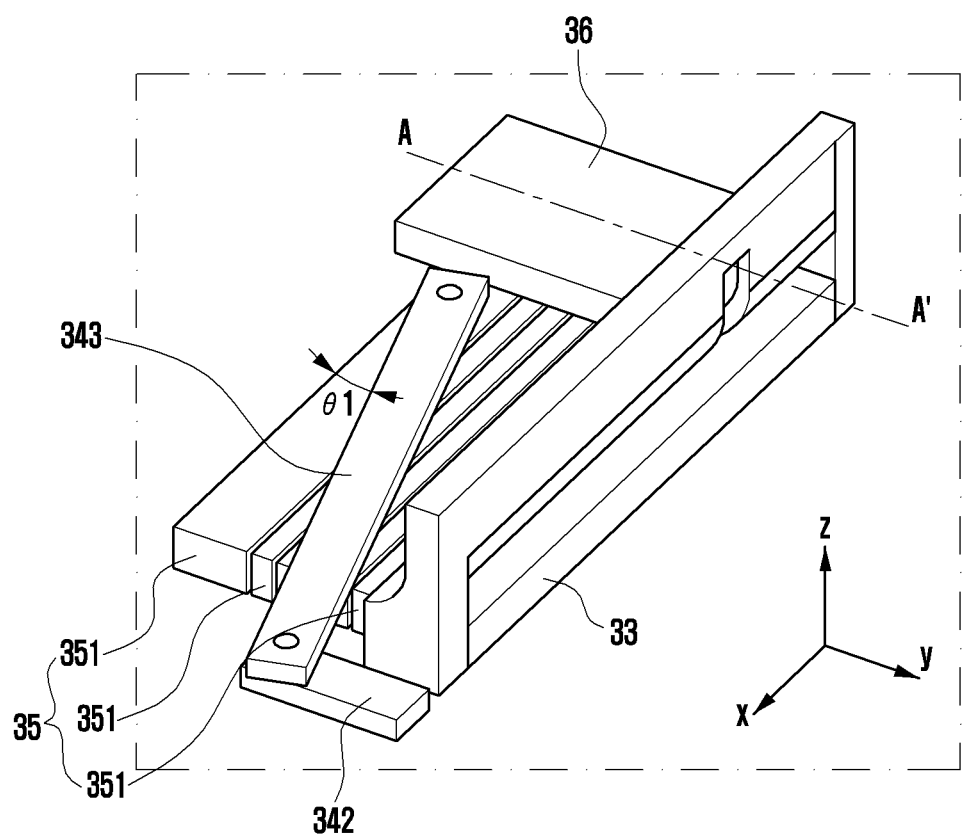
FIG. 3D is a perspective view illustrating a protruding and retracting member, an interlocking structure, a connecting member, and a guide according to an embodiment of the disclosure.

FIG. 3D is a perspective view illustrating a protruding and retracting member 33, interlocking structure 34, a connecting member 35, and a guide 36 according to an embodiment of the disclosure.

Figure 3E:
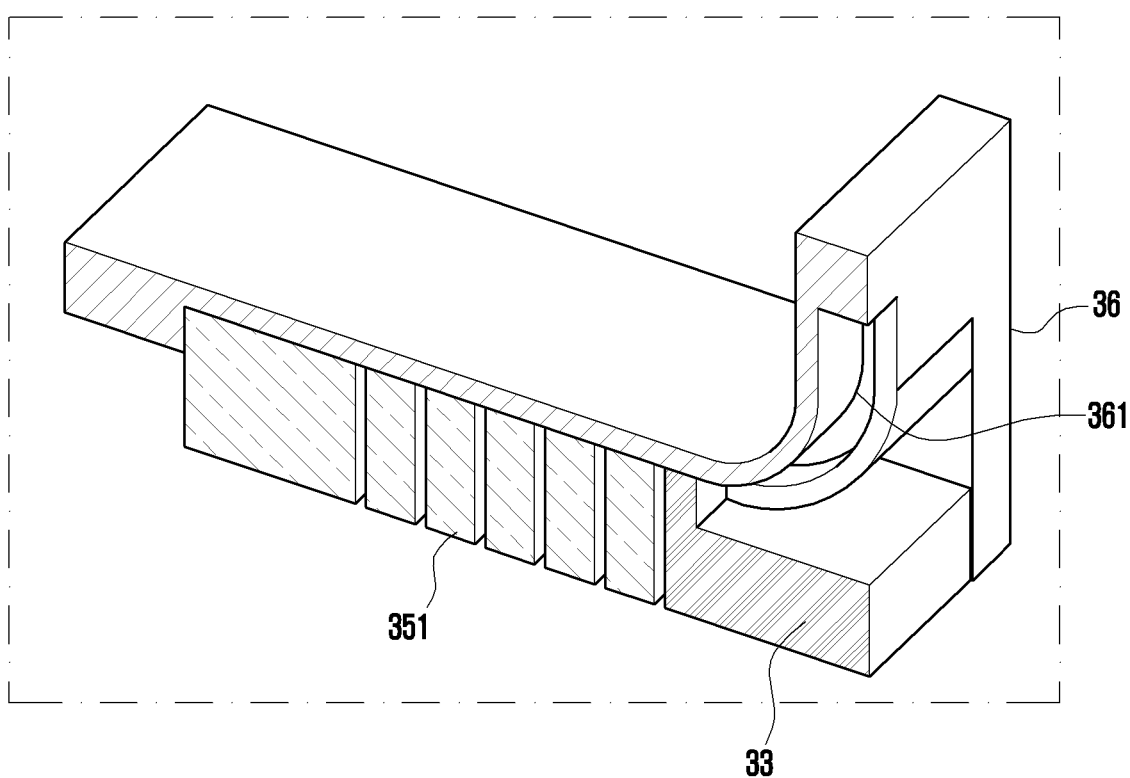
FIG. 3E is a cross-sectional view illustrating a protruding and retracting member, a connecting member, and a guide according to an embodiment of the disclosure.

FIG. 3E is a cross-sectional view illustrating the protruding and retracting member 33, the connecting member 35, and the guide 36 according to an embodiment of the disclosure.

Figure 3F:
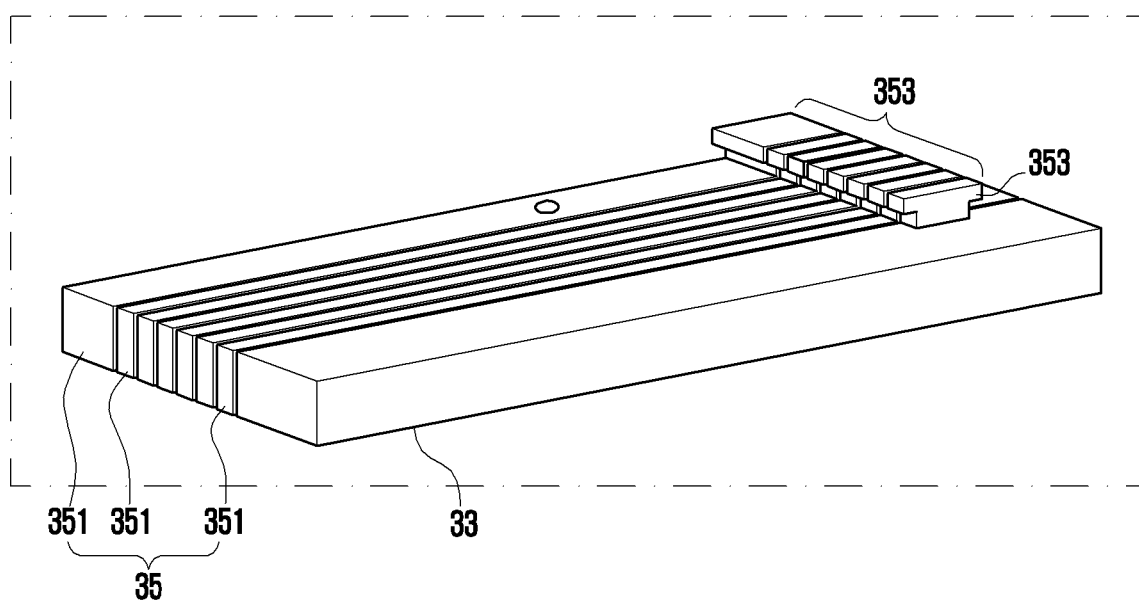
FIG. 3F is a perspective view illustrating a protruding and retracting member and a connecting member according to an embodiment of the disclosure.

FIG. 3F is a perspective view illustrating the protruding and retracting member 33 and the connecting member 35 according to an embodiment of the disclosure.

Referring to FIG. 3D, the first housing 31, the second housing 32, and a sliding rail 341 are omitted for clarity. The cross-section of FIG. 3E is a cross-section in A-A' direction of FIG. 3D.

Referring to FIGS. 3A and 3B, the electronic device 101 may include an interlocking structure 34, a connecting member 35, and a guide 36.

The interlocking structure 34 may convert a sliding movement of the first housing 31 and the second housing 32 according to the withdrawal and retraction of the flexible display panel 161 into a lateral (represented in an y axis on the drawing) movement of the electronic device 101. The interlocking structure may be slidably coupled to at least one of the first housing 31 or the second housing 32 in at least one portion thereof. One end of the interlocking structure may be connected to a connecting member 35 to be described later. In embodiments of the disclosure, the interlocking structure 34 may include a link, cam, pinion, rail, and/or similar power transmission mechanism as a mechanism for converting a direction of a movement.

Referring to FIGS. 3A and 3D, the interlocking structure 34 of the electronic device 101 according to some embodiments may include a sliding rail 341, a sliding block 342, and a link bar 343. The sliding rail 341 may be slidably coupled to a sliding block 342 to be described later and be disposed in the x-axis direction on an inner side surface of at least one of the first housing 31 or the second housing 32. The sliding block 342 and the link bar 343 may be rotatably connected to each other, and the link bar may be disposed at a first angle θ with respect to the connecting member 35.

Referring to FIGS. 3B and 3C, the sliding rail 341 according to some embodiments may be fixedly disposed at the second housing 32, and in other embodiments of the disclosure, the sliding rail 341 may be fixedly disposed at the first housing 31. The sliding rail 341 may include a groove 3411 formed on an inner side surface of at least one of the first housing 31 or the second housing 32.

One end portion of the sliding block 342 may be slidably coupled to the sliding rail 341. The sliding rail 341 may prevent the sliding block 342 from moving in the y-axis direction with respect thereto and enable the sliding block 342 to move only in the x-axis direction. The other end portion of the sliding block 342 may be rotatably coupled to one end portion of the link bar 343 to be described later. In some embodiments of the disclosure, the sliding block 342 may include a rotation shaft and/or a shaft hole for rotatable coupling with the link bar 343 at the other end portion.

The link bar 343 may have one end portion rotatably coupled to the sliding block and the other end portion rotatably coupled to the connecting member 35. The link bar 343 may convert a direction of a force in the x-axis direction received by the sliding block into a force in the y-axis direction, and transfer the force to the connecting member 35.

The connecting member 35 may be movably connected to the interlocking structure 34, be coupled to the protruding and retracting member 33 at one end, and be slidably coupled to a guide 36 to be described later. While the connecting member 35 receives a lateral movement converted by the interlocking structure 34 and is driven by it, the connecting member 35 may be guided by the guide 36 to move the protruding and retracting member 33 in the y-axis and z-axis directions on the drawing. Because the protruding and retracting member 33 is coupled to one end of the connecting member 35, the protruding and retracting member 33 may be moved to a position that may cover an exposed side surface of the flexible display panel 161 by a movement of the connecting member 35. The connecting member may include a flexible structure so that it may be guided by the guide 36.

Referring to FIG. 3F, the connecting member 35 according to some embodiments may have a multi-joint structure including a plurality of bars 351 rotatably connected to each other in order to have flexibility. In order to rotatably connect the plurality of bars 351 to each other, the connecting member 35 may include a joint structure, such as a barrel hinge, a flexible hinge, or a living hinge. A thickness of each bar of the plurality of bars 351 may be the same or different, as needed.

In some embodiments of the disclosure, the connecting member 35 and the protruding and retracting member may include guide blocks 353 and 333. The guide blocks 353 and 333 may be a structure for enabling the connecting member 35 to be slidably coupled to the guide 36 without being separated from the guide 36. In some embodiments of the disclosure, the guide block may have a T-shaped, Π-shaped, P-shaped or similar cross-section.

Referring to FIG. 3B, in some embodiments of the disclosure, the guide 36 may be fixed to the first housing 31, and the sliding rail 341 may be fixed to the second housing 32. The link bar 343 may apply a force by changing a direction of the force in the y-axis direction so that the connecting member 35 moves by being guided by the guide 36 using a force in the x-axis direction applied to the sliding block 342 by a relative movement of the second housing 32 with respect to the first housing 31.

Referring to FIG. 3C, in another embodiment of the disclosure, contrary to the above description, the guide 36 may be fixed to the second housing 32, and the sliding rail may be fixed to the first housing 31.

Referring to FIG. 3E, the guide 36 may be slidably coupled to the connecting member 35. While limiting a movement of the connecting member 35 in the x-axis direction, the guide 36 may guide a moving direction of the connecting member 35 so as to protrude the protruding and retracting member 33 to a space between the first housing and the second housing as the connecting member 35 moves in lateral and vertical directions of the electronic device 101.

In some embodiments of the disclosure, the guide 36 may include a guide rail 361 slidably coupled to the guide block 353 of the connecting member 35 and configured to drive the connecting member in the y-axis and z-axis directions of the electronic device 101. Referring to FIG. 3E, the guide rail 361 may be a J-shaped rail including straight and curved sections.

The guide rail 361 may include a groove formed on a surface of the guide 36 in contact with the connecting member 35 in a cross-sectional shape corresponding to a cross-section of the guide block 353. For example, in the case that the guide block 353 has a f-shaped cross section, the guide rail 361 may include a T-shaped groove corresponding to the T-shaped cross section of the guide block 353.

Shapes of the guide rail 361 and the guide block 353 of the electronic device according to the embodiment of this document are only an embodiment of the disclosure, and the disclosure is not limited thereto and may be formed in various shapes.

Figure 4:
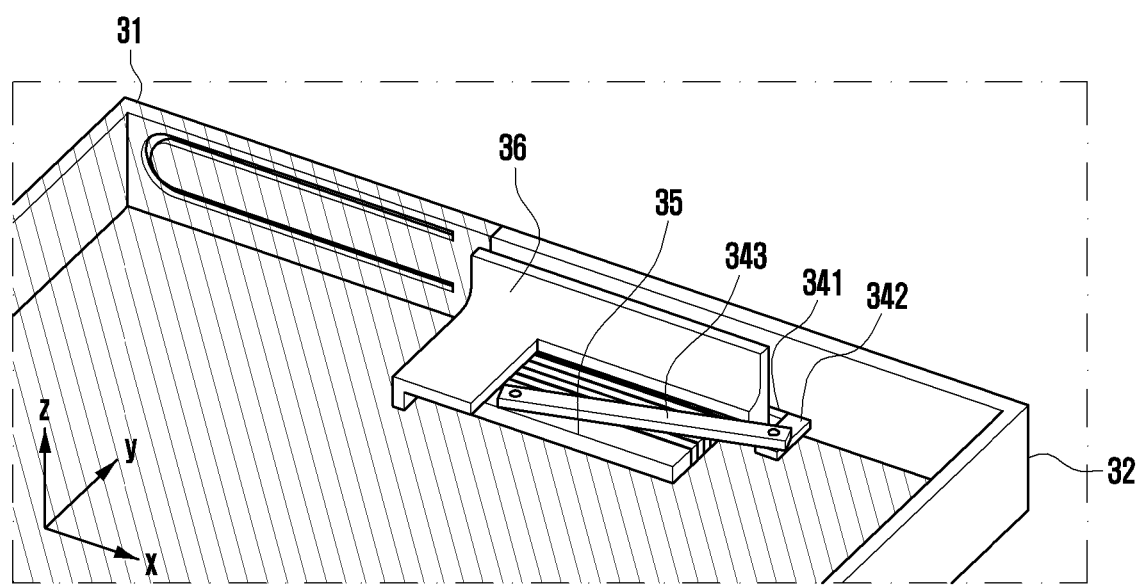
FIG. 4 is an internal perspective view illustrating a protruding process of a protruding and retracting member of an electronic device according to an embodiment of the disclosure.

FIG. 4 is an internal perspective view illustrating a protruding process of a protruding and retracting member 33 of the electronic device 101 according to an embodiment of the disclosure.

Referring to FIG. 4, in a state in which the flexible display panel 161 of the electronic device 101 is retracted, the sliding block 342 may be positioned at one end portion of the sliding rail 341 in the x-axis direction. With reference to FIG. 4, when the second housing 32 moves in the x-axis direction with respect to the first housing 31 so as to draw out the flexible display panel 161 of the electronic device 101, the sliding block 342 may slide with respect to the sliding rail 341 to be positioned at the other end portion of the sliding rail 341. With reference to FIG. 4, when the sliding block 342 moves from a state of FIG. 4, in the case that the second housing 32 moves with respect to the first housing 31, the sliding block 342 may move in the −x-axis direction with respect to the second housing. With reference to FIG. 4, when the second housing 32 continues to slide in the state of 4, the sliding block 342 may receive a force in the x-axis direction at the other end portion of the sliding rail 341.

Figure 5A:
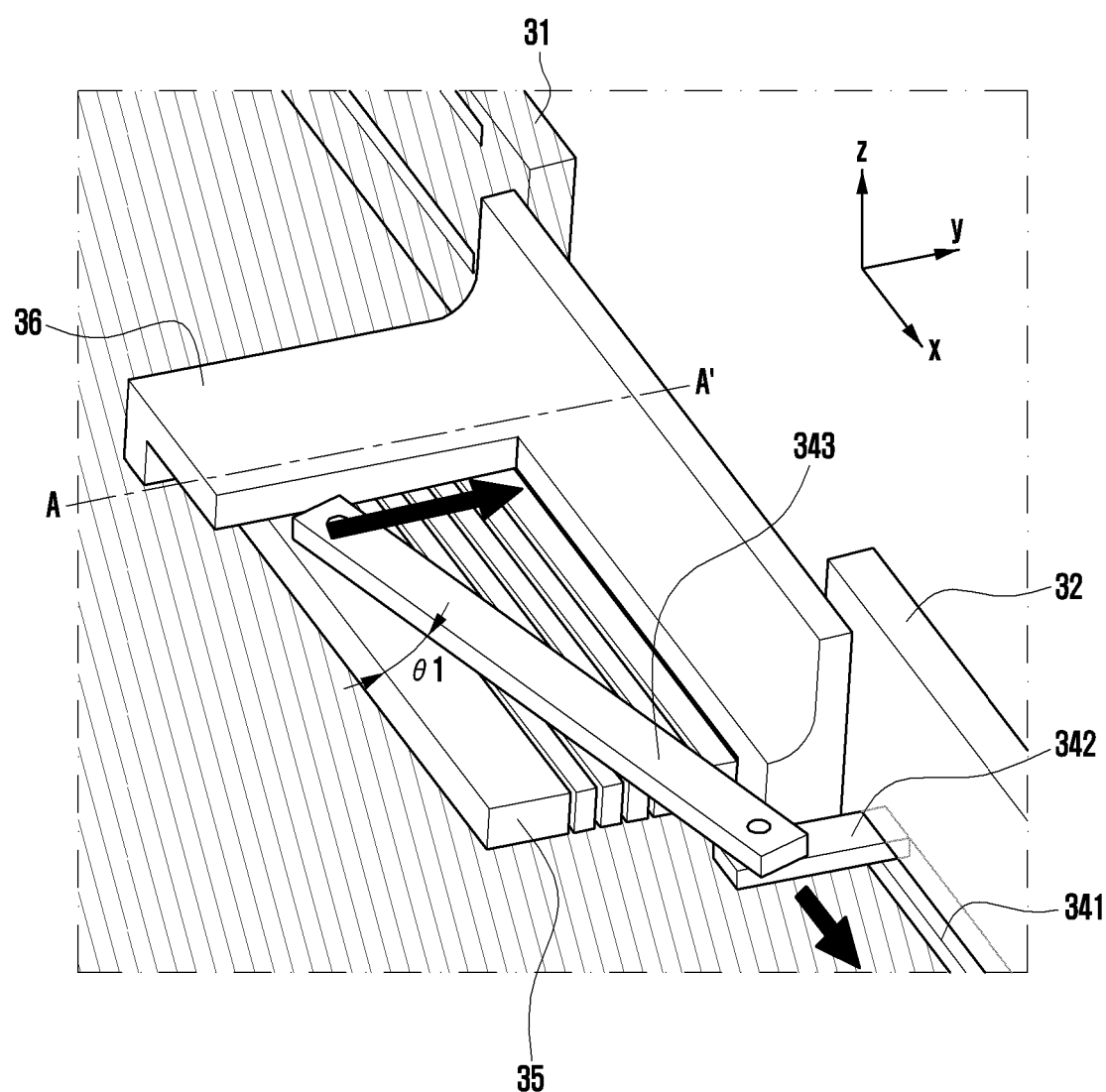
FIG. 5A is an enlarged view illustrating the principle of operation of a link bar of an electronic device according to an embodiment of the disclosure.

FIG. 5A is an enlarged view illustrating an operation of the link bar 343 of the electronic device 101 according to an embodiment of the disclosure.

Figure 5B:
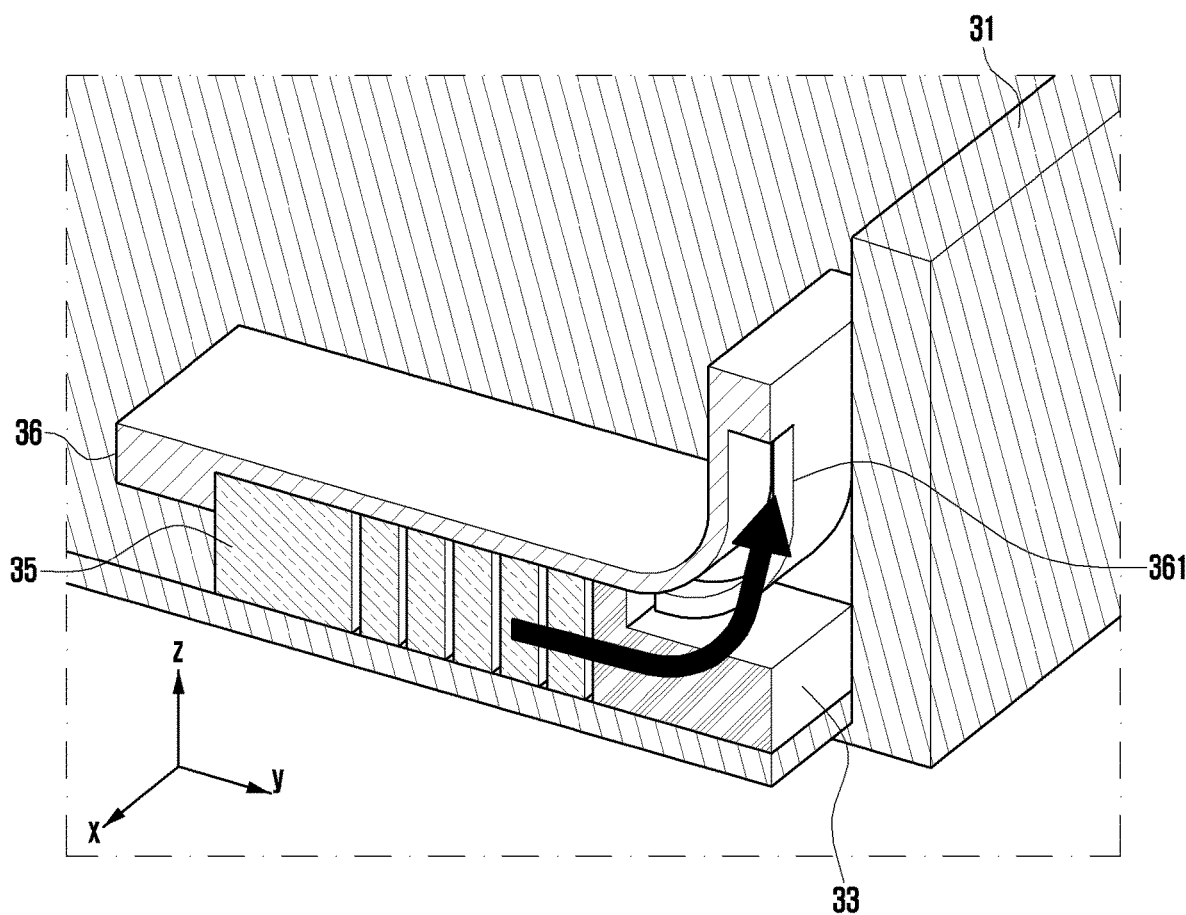
FIG. 5B is a cross-sectional view illustrating an operation of a connecting member and a guide according to an embodiment of the disclosure.

FIG. 5B is a cross-sectional view illustrating an operation of the connecting member 35 and the guide 36 according to an embodiment of the disclosure.

Figure 5C:
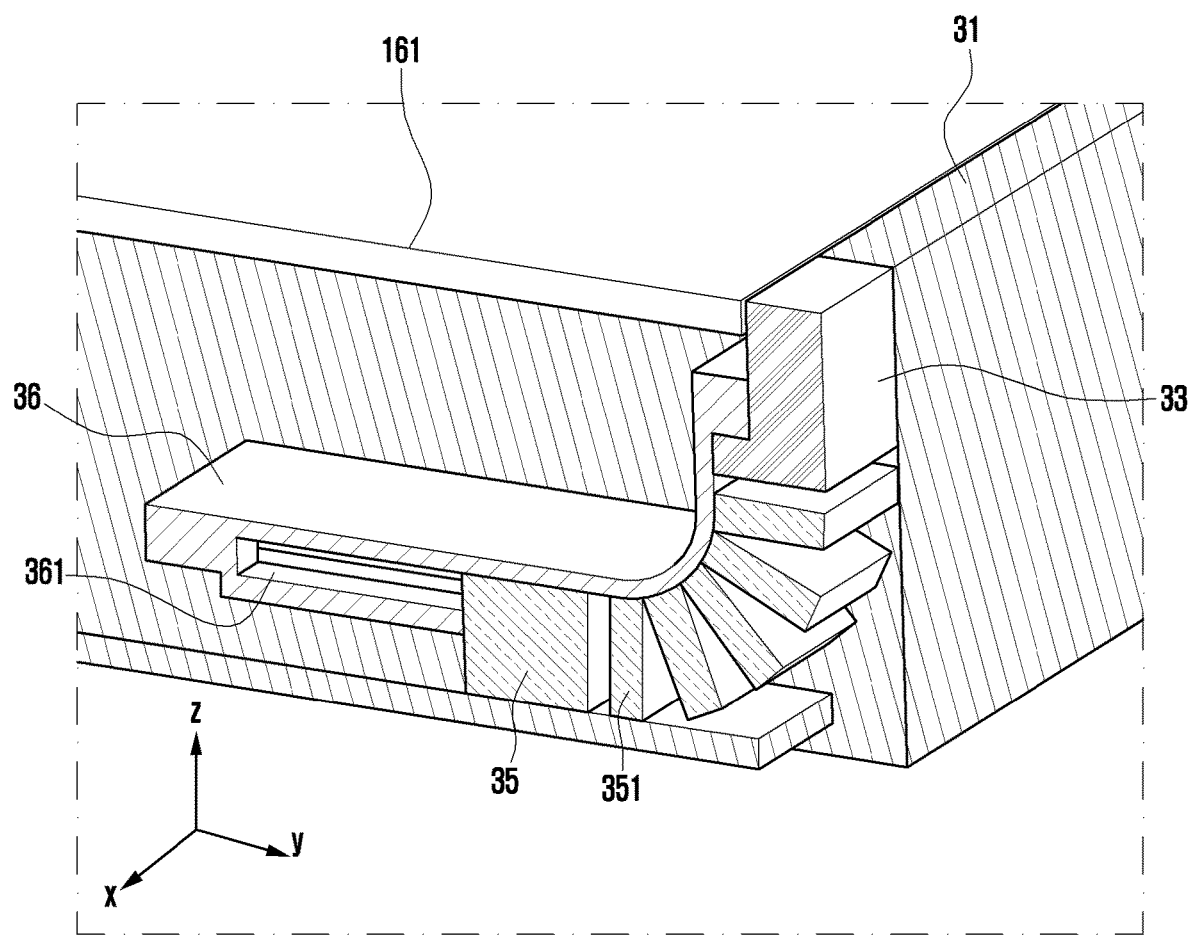
FIG. 5C is a cross-sectional view illustrating positions of a connecting member and a guide in a protruding state of a protruding and retracting member according to an embodiment of the disclosure.

FIG. 5C is a cross-sectional view illustrating positions of the connecting member 35 and the guide 36 in a state in which the protruding and retracting member 33 is protruded according to an embodiment of the disclosure.

The cross sections of FIGS. 5B and 5C are cross sections cut along A-A' direction of FIG. 5A.

Referring to FIG. 5A, the link bar 343 according to an embodiment of the disclosure may be rotatably coupled to each of the sliding block 342 and the connecting member 35 and be disposed at a first angle θ with respect to the connecting member 35. When the sliding movement of the second housing is applied in the x-axis direction in a slate in which the sliding block 342 is positioned at the other end portion of the sliding rail 341, the sliding block 342 may be coupled to one end away from the center of the link bar 343 to apply a rotational force to the link bar 343. The rotational force of the link bar 343 may be converted and applied to a force of a y-axis direction with respect to the connecting member 35 coupled to the other end portion of the link bar.

The connecting member 35 may be rotatably coupled to the link bar 343 and operated by a force converted by the link bar 343 in the y-axis direction. Referring to FIGS. 5B and 5C, the guide rail 361 of the guide 36 provides a curved path for converting a movement of the connecting member 35 in the y-axis direction to the z-axis direction. In some embodiments of the disclosure, the guide rail 361 may include a J-shaped curved path. The connecting member 35 moves along a J-shaped curved path by the guide rail 361, thereby protruding the protruding and retracting member 33 coupled to one end of the connecting member 35 into the space between the first housing and the second housing. The protruding and retracting member 33 may exist in a location that covers a lateral portion of the flexible display panel 161 exposed to the space between the first housing 31 and the second housing 32 in a state in which the flexible display panel 161 is drawn out.

Figure 6A:
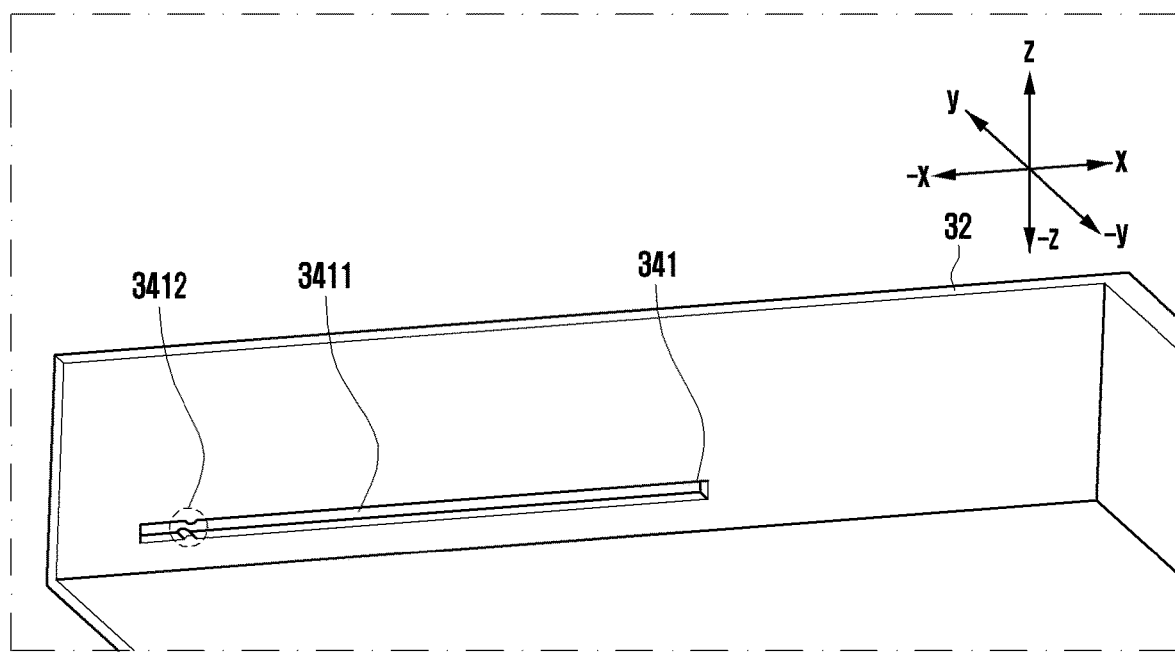
FIG. 6A is a perspective view illustrating a sliding rail according to an embodiment of the disclosure.

FIG. 6A is a perspective view illustrating a sliding rail 341 according to an embodiment of the disclosure.

Figure 6B:
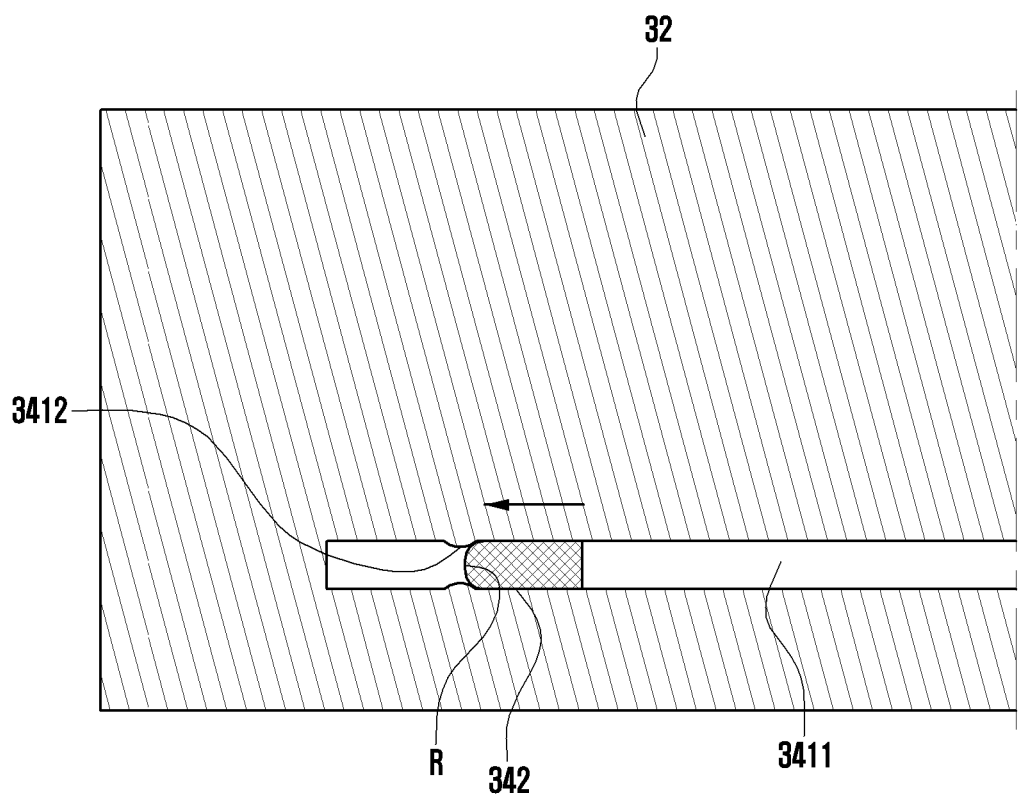
FIG. 6B is a cross-sectional view illustrating actions of a sliding rail, a sliding block, and a sliding limiting member during a withdrawal operation according to an embodiment of the disclosure.

FIG. 6B is a cross-sectional view illustrating actions of the sliding rail 341, the sliding block 342, and a sliding limiting member 3412 during a withdrawal operation according to an embodiment of the disclosure.

Figure 6C:
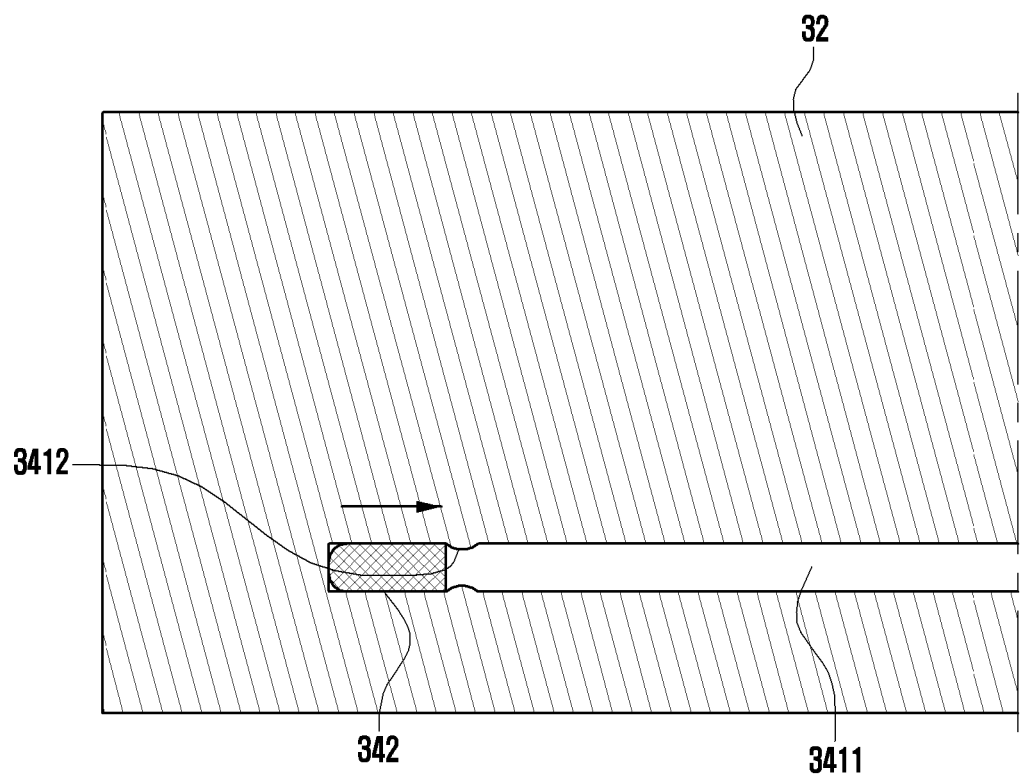
FIG. 6C is a cross-sectional view illustrating actions of a sliding rail, a sliding block, and a sliding limiting member during a retraction operation according to an embodiment of the disclosure.

FIG. 6C is a cross-sectional view illustrating actions of the sliding rail 341, the sliding block 342, and the sliding limiting member 3412 during a retraction operation according to an embodiment of the disclosure.

Arrows marked in FIGS. 6B and 6C represent a relative movement of the sliding block 342 with respect to the sliding rail 341.

Referring to FIG. 6A, in some embodiments of the disclosure, the sliding rail 341 may include a sliding limiting member 3412. The sliding limiting member may be disposed on the sliding rail 341 to be close to a distal end portion in a direction in which the flexible display panel 161 is retracted (−x direction in the drawing). In some embodiments of the disclosure, the sliding limiting member 3412 may include a protrusion formed on an inner surface of the groove 3411 formed at an inner surface of the first housing or the second housing.

Referring to FIG. 6B, when the user performs an operation of withdrawing the flexible display panel 1161 of the electronic device 1011, the sliding limiting member 3412 may provide a low resistance force to a sliding movement between the sliding block 342 and the sliding rail 341. Therefore, the sliding block 342 may easily pass through the sliding limiting member 3412 to reach a distal end portion of the sliding rail 341.

Referring to FIG. 6C, conversely, when the user performs an operation of retracting the flexible display panel 161, the sliding limiting member 3412 may provide a high resistance force to the sliding movement between the sliding block 342 and the sliding rail 341. Therefore, the sliding block 342 may not easily pass through the sliding limiting member 3412, and the sliding block 342 may receive a force from the second housing in the −x direction. The force received by the sliding block 342 in the −x direction may drive the link bar 343 and the connecting member 35 so that the protruding and retracting member is retracted into the electronic device 101.

In some embodiments of the disclosure, in the cross section of the sliding block 342, an end portion in the −x direction may have a shape that is easy to pass through the sliding limiting member 3412, and an end portion in the opposite direction may have a shape that is unfavorable for passing through the sliding limiting member 3412. For example, the sliding block 342 may include a chamfering or rounding (R) shape with respect to a corner at an end portion in the −x direction, and maintain a corner shape with small or no chamfering or rounding value at an end portion in the opposite direction.

In another embodiment of the disclosure, the sliding block 342 and the sliding limiting member 3412 may include a bump structure having a lateral symmetric inclined surface. In other embodiments of the disclosure, the sliding limiting member 3412 may include an asymmetrical movement limiting mechanism, such as a ratchet.

Figure 7A:
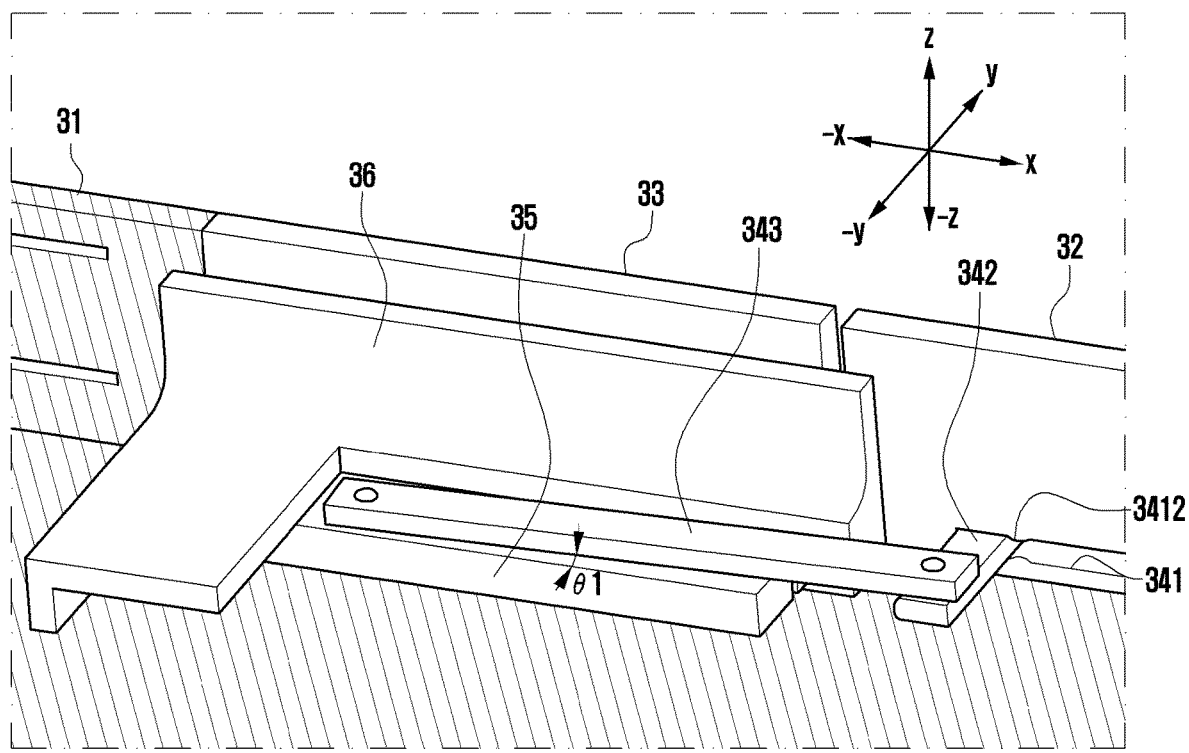
FIGS. 7A and 7B are internal perspective views illustrating a retracting action of a protruding and retracting member according to an embodiment of the disclosure.
Figure 7B:
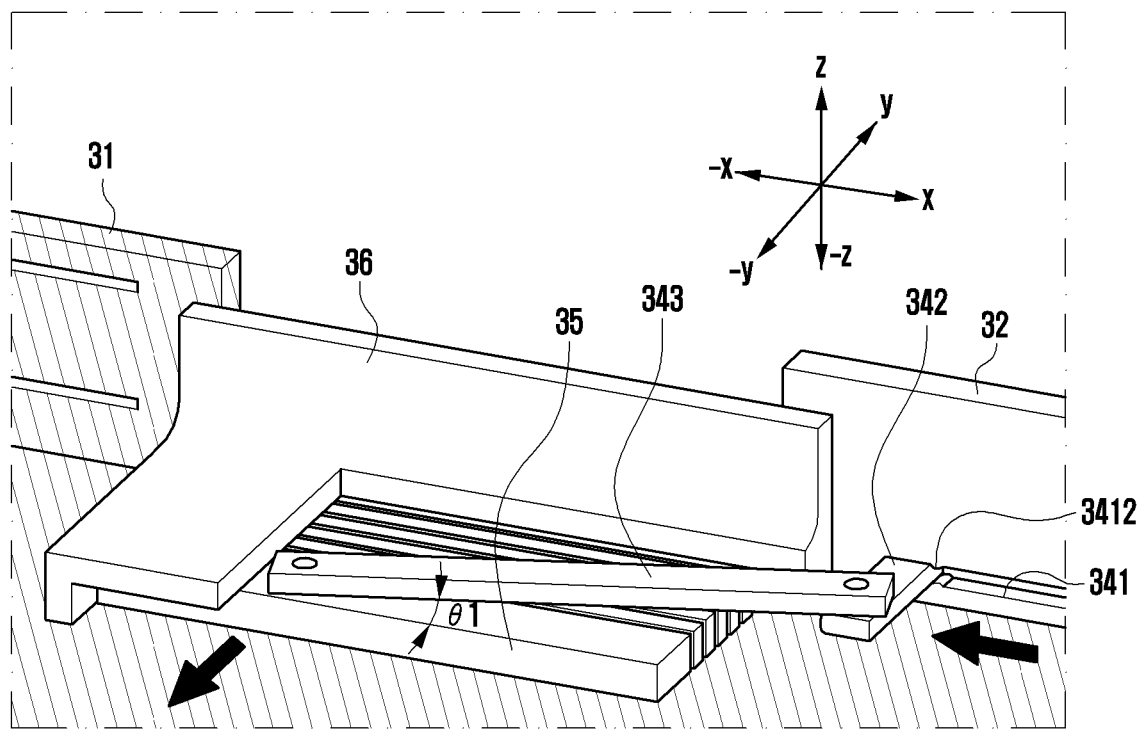

FIGS. 7A and 7B are internal perspective views illustrating a retraction action of the protruding and retracting member 33 according to an embodiment of the disclosure.

Referring to FIGS. 7A and 7B, in a state in which the protruding and retracting member 33 is protruded, the link bar 343 may be disposed at a second angle θ with respect to the connecting member 35. The second angle θ may be smaller than a first angle θ, which is an angle formed by the link bar 343 and the connecting member 35 in a state in which the protruding and retracting member 33 is retracted.

When the user performs an action of retracting the flexible display panel 161, the sliding limiting member 3412 may provide a high resistance force to a sliding movement between the sliding block 342 and the sliding rail 341. Therefore, the sliding block 342 may not easily pass through the sliding limiting member 3412, but receive a force from the second housing in the −x direction. Accordingly, the sliding block 342 may drive the link bar 343 and the connecting member in a direction in which the protruding and retracting member is retracted into the electronic device 101. After the driving of the connecting member is completed, when an additional force is applied to the second housing, the sliding block 342 may pass through the sliding limiting member 3412 and move on the sliding rail 341.

Figure 8A:
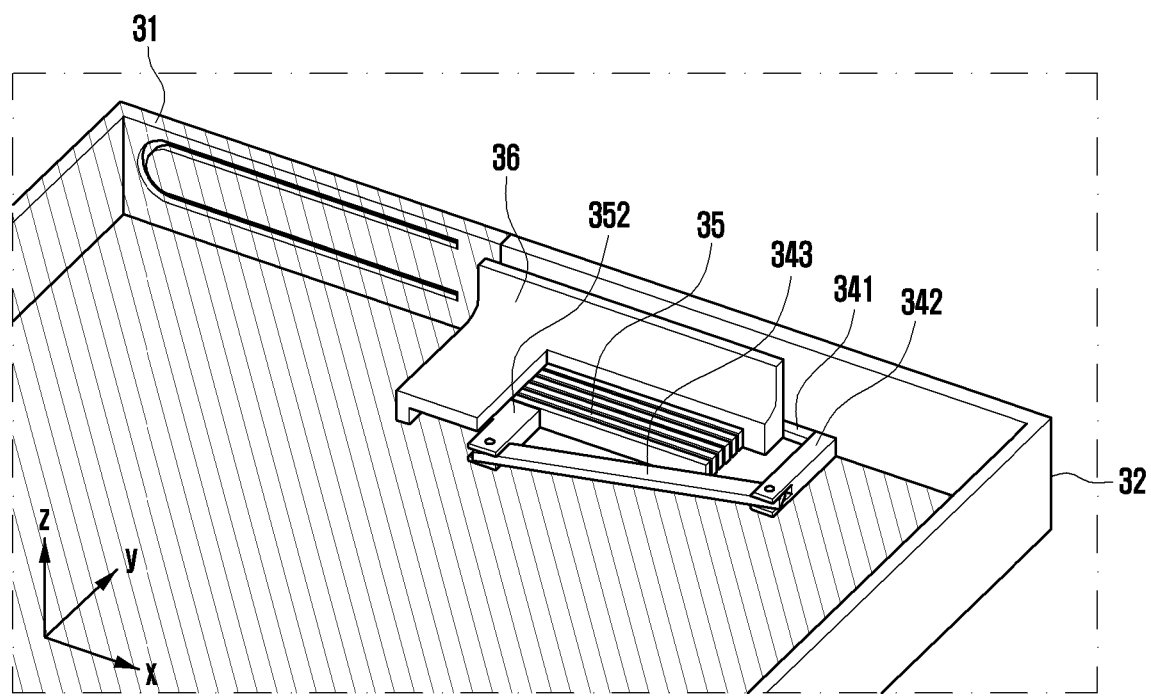
FIG. 8A is an internal perspective view illustrating a connecting member and an interlocking structure of an electronic device according to an embodiment of the disclosure.

FIG. 8A is an internal perspective view illustrating a connecting member 35 and an interlocking structure 34 of the electronic device 101 according to an embodiment of the disclosure.

Figure 8B:
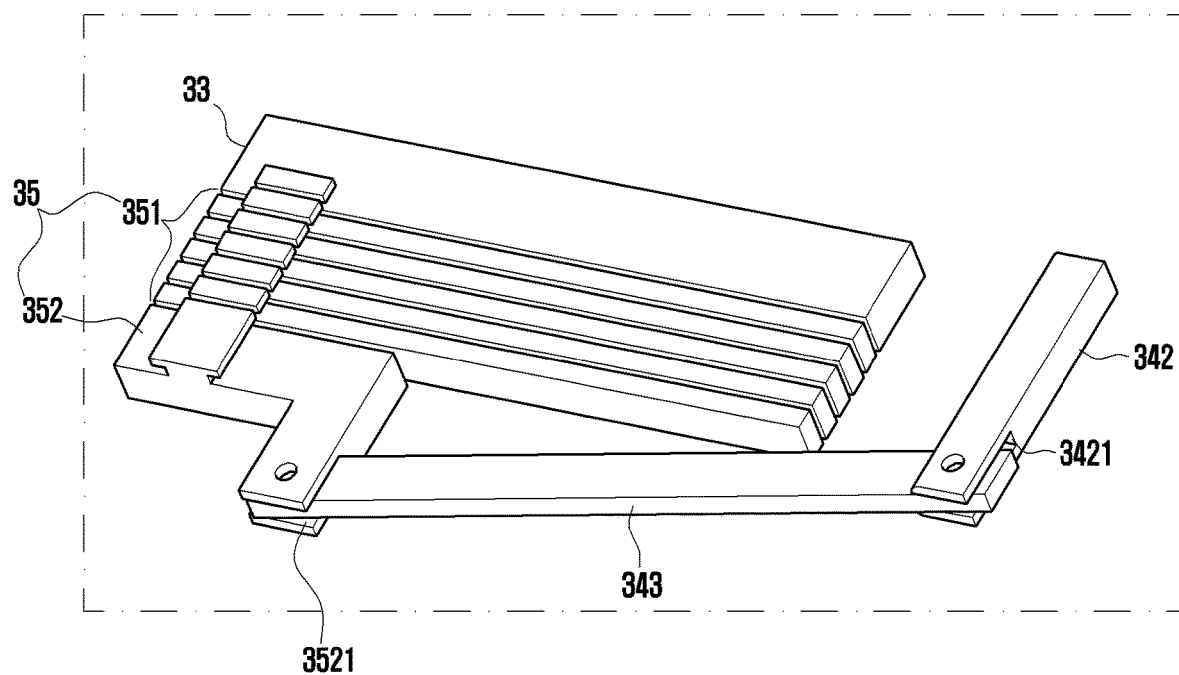
FIG. 8B is a perspective view illustrating a connecting member, a link bar, and an interlocking structure of an electronic device according to an embodiment of the disclosure.

FIG. 8B is a perspective view illustrating a connecting member 35, a link bar 343, and an interlocking structure 34 of the electronic device 101 according to an embodiment of the disclosure.

Referring to FIG. 8B, the connecting member 35 may include a plurality of bars 351 disposed in parallel and a flat connecting member 352 having one surface perpendicular to the plurality of bars 351 on a plane. The side parallel to the plurality of bars 351 may be coupled to the plurality of bars 351 so that the connecting member 35 may have flexibility, and the side perpendicular to the plurality of bars 351 may be rotatably coupled to the link bar 343. In some embodiments of the disclosure, the flat connecting member 352 and the sliding block 342 may include coupling grooves 3521 and 3421, respectively to which both end portions of the link bar 343 may be rotatably coupled. In some embodiments of the disclosure, each of the coupling grooves 3521 and 3421 may include a shaft hole for rotatably coupling both end portions of the link bar 343. In FIG. 8B, the L-shaped flat connection member 352 is an embodiment for reducing a mounting space, and the disclosure is not limited thereto, and the flat connection member 352 may include various shapes for coupling with the link bar on a plane. For example, the flat connecting member 352 may have a simple rectangular shape or a T-shape according to a position connecting the connecting member 35 and the link bar 343, and two sides of the flat connecting member 352 may form an acute angle or an obtuse angle not 90 degrees.

Referring to FIG. 8A, both ends of the link bar 343 are inserted into the coupling grooves 3521 and 3421 to be rotatably coupled to the coupling grooves 3521 and 3421. Thus, the link bar 343, the sliding block 342, and the flat connecting member 352 may be positioned at a same height. Such a constitution has the advantage capable of minimizing a thickness required for mounting inside the electronic device 101 by reducing the overall height of the interlocking structure 34.

Figure 9A:
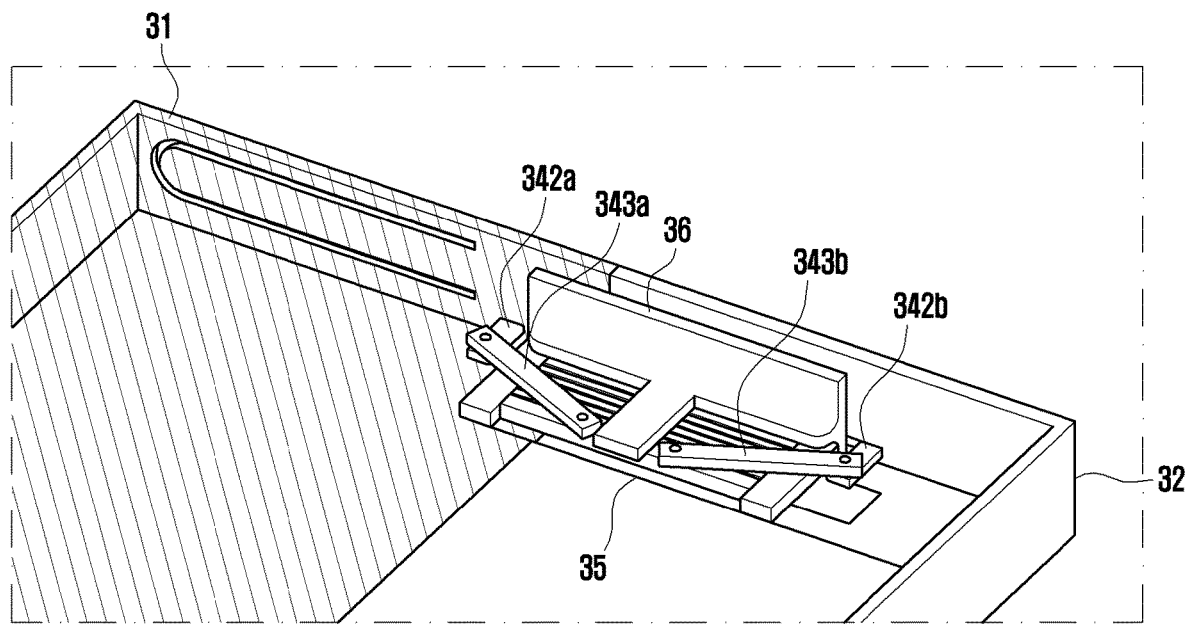
FIG. 9A is a perspective view illustrating the inside of an electronic device in a state in which a flexible display panel of the electronic device is retracted according to an embodiment of the disclosure.

FIG. 9A is a perspective view illustrating the inside of the electronic device 101 in a state in which the flexible display panel 161 of the electronic device 101 is retracted according to an embodiment of the disclosure.

Figure 9B:
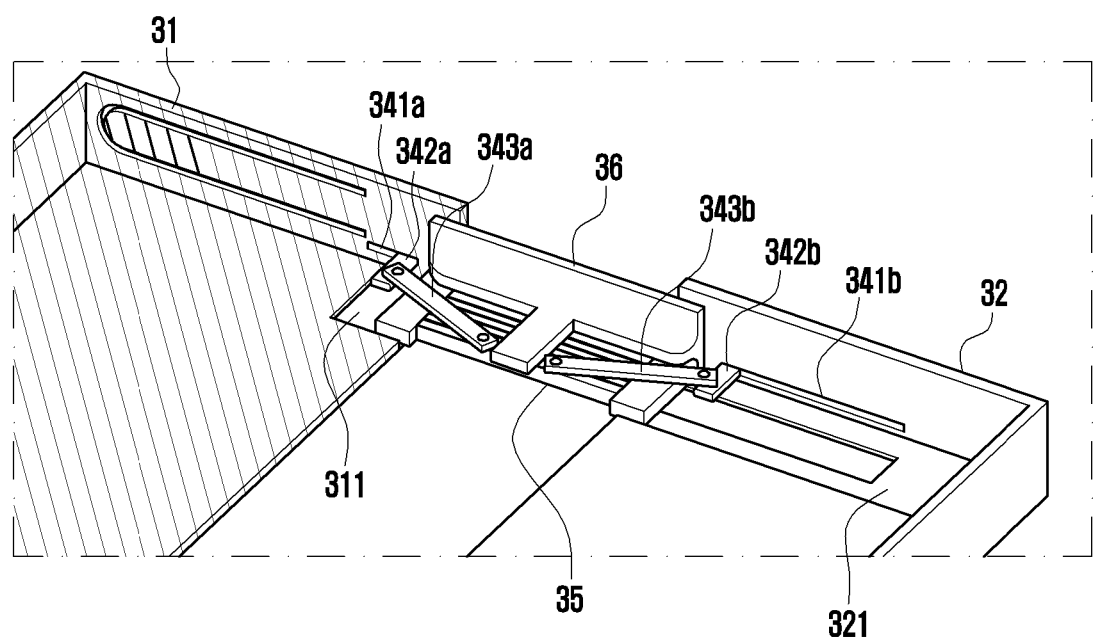
FIG. 9B is a perspective view illustrating the inside of an electronic device in a state in which a flexible display panel of the electronic device is drawn out according to an embodiment of the disclosure.

FIG. 9B is a perspective view illustrating the inside of the electronic device 101 in a state in which the flexible display panel 161 of the electronic device 101 is drawn out according to an embodiment of the disclosure.

Figure 9C:
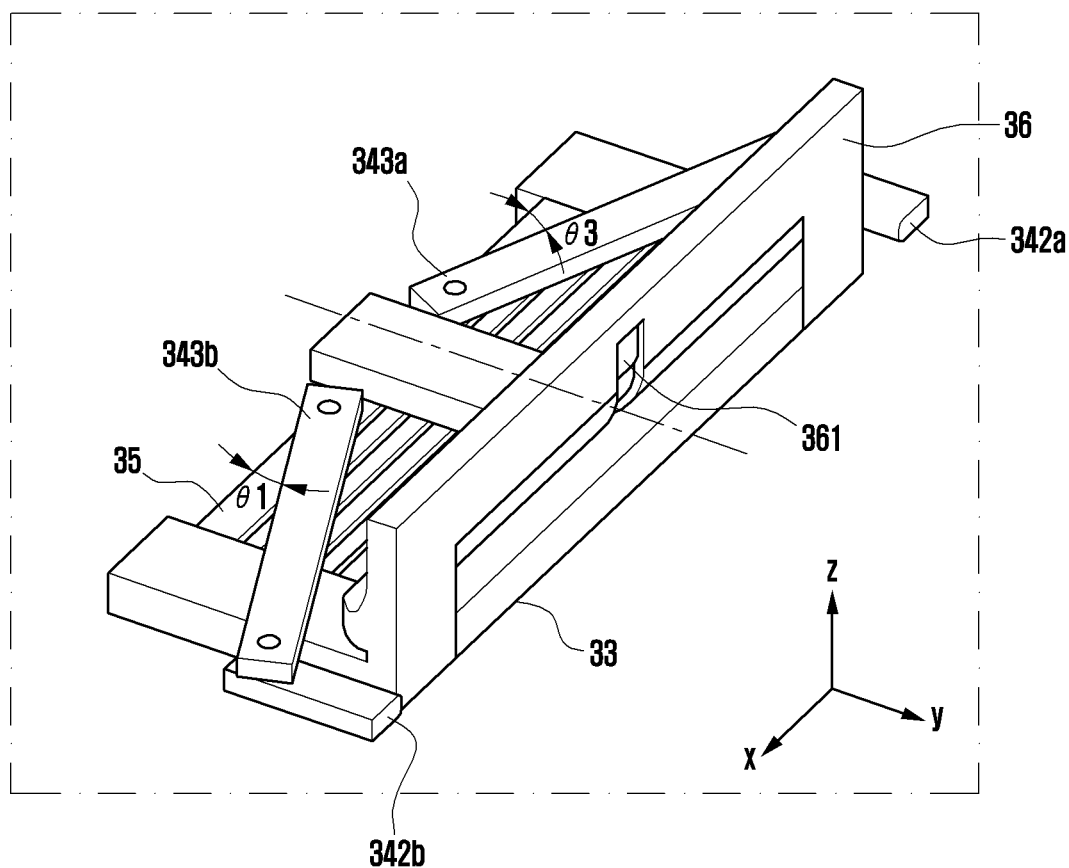
FIG. 9C is a perspective view illustrating an electronic device according to an embodiment of the disclosure.

FIG. 9C is a perspective view illustrating the electronic device 101 according to an embodiment of the disclosure.

Referring to FIGS. 9A to 9C, an interlocking structure 34 of the electronic device 101 according to another embodiment of the disclosure may include a first sliding rail 341a, a second sliding rail 341b, a first sliding block 342a, a second sliding block 342b, a first link bar 343a, and a second link bar 343b.

The first sliding rail 341a may include a first groove 341a formed at an inner side surface of the first housing 31, and the second sliding rail 341b may include a second groove 341b formed at an inner side surface of the second housing 32.

In some embodiments of the disclosure, a length of the first sliding rail 341a may be shorter than that of the second sliding rail 341b. In another embodiment of the disclosure, a length of the second sliding rail 341b may be shorter than that of the first sliding rail 341a, The first sliding block 342a and the second sliding block 342b may be slidably coupled to the first sliding rail 341a and the second sliding rail 341b, respectively.

The first link bar 343a and the second link bar 343b may have one end portions rotatably coupled to the first sliding block 342a and the second sliding block 342b, respectively, and the other end portions rotatably coupled to the connecting member 35. In some embodiments of the disclosure, the first link bar 343a and the second link bar 343b may be disposed to form a first angle θ and a third angle θ with the connecting member 35, respectively in a direction in which the other end portions face each other. Magnitudes of the first angle θ and the third angle θ may be determined according to lengths of the first link bar 343a and the second link bar 343b, positions in which the first link bar 343a and the second link bar 343b are coupled to the connecting member 35, and positions of the first sliding block 342a and the second sliding block 342b. In some embodiments of the disclosure, the first angle θ and the third angle θ may be substantially the same, and the first link bar 343a and the second link bar 343b may be symmetrically disposed with respect to the yz plane.

The guide 36 may include a guide rail 361 disposed at the center thereof, and the connecting member 35 may include a guide block 353 disposed at a position corresponding to that of the guide rail 361. The first link bar 343a and the second link bar 343b may be rotatably coupled to the connecting member 35 at a point forming left-right symmetry around the guide block 353 of the connecting member 35.

With reference back to FIG. 9B, the first housing 31 and the second housing 32 may have a first guide seating portion 3111 and a second guide seating portion 321, respectively. The first guide seating portion 311 and the second seating portion 321 may include grooves formed on inner bottom surfaces of the first housing 31 and the second housing 32. The guide 36 may be slidably disposed with respect to the first guide seating portion 311 and the second guide seating portion 321.

When the user performs an operation of withdrawing the flexible display panel 161 of the electronic device 101, the first housing 31 and the second housing 32 slide in the −x-axis and x-axis direction based on the guide 36, respectively, and the first sliding block 342a and the second sliding block 342b reach both end portions. In this state, in the case that the first housing 31 and the second housing 32 further slide, the first sliding block 342a and the second sliding block 342b receive a force in the −x and x-axis directions, respectively, and this is transferred by the first link bar 343a and the second link bar 343b to apply a force to the connecting member 35 in the y-axis direction. In the above-described constitution, the force applied to the connecting member 35 is symmetrical, and an unbalanced force is thus applied to the connecting member 35 in the x or −x-axis direction to prevent a frictional force between the guide rail 361 and the guide block 353 from increasing.

Figure 10A:
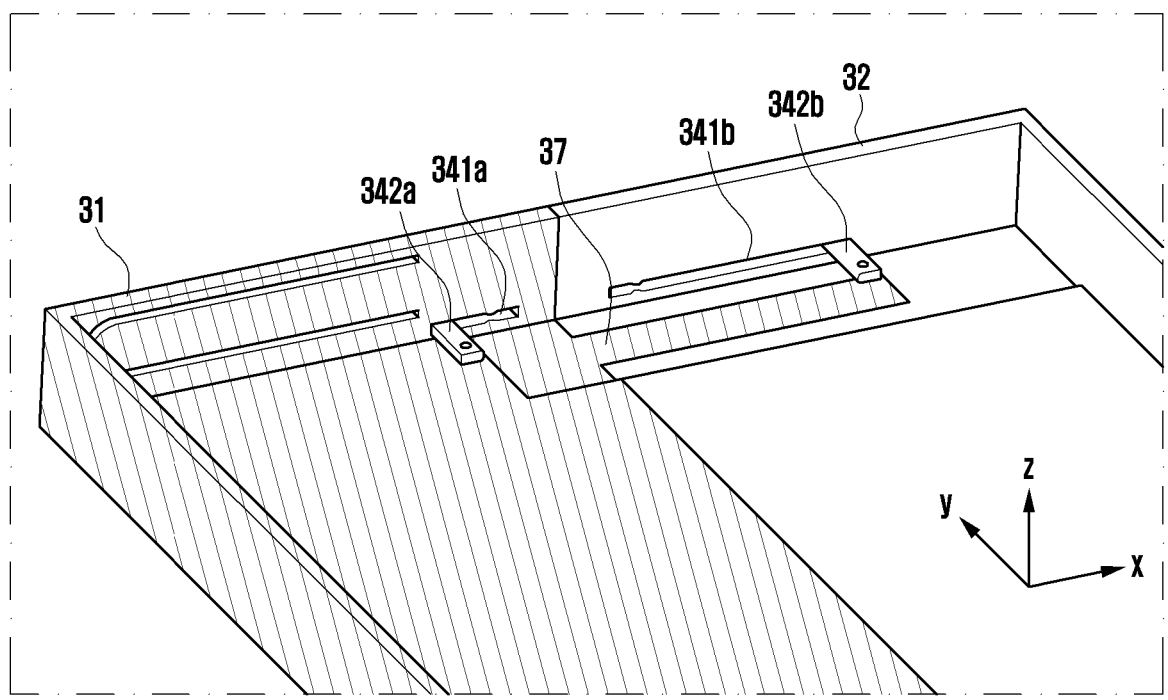
FIG. 10A is an internal perspective view illustrating a foreign material blocking member in a state in which a flexible display panel of an electronic device is retracted according to an embodiment of the disclosure.

FIG. 10A is an internal perspective view illustrating a foreign material blocking member 37 in a state in which the flexible display panel 161 of the electronic device 101 is retracted according to an embodiment of the disclosure.

Figure 10B:
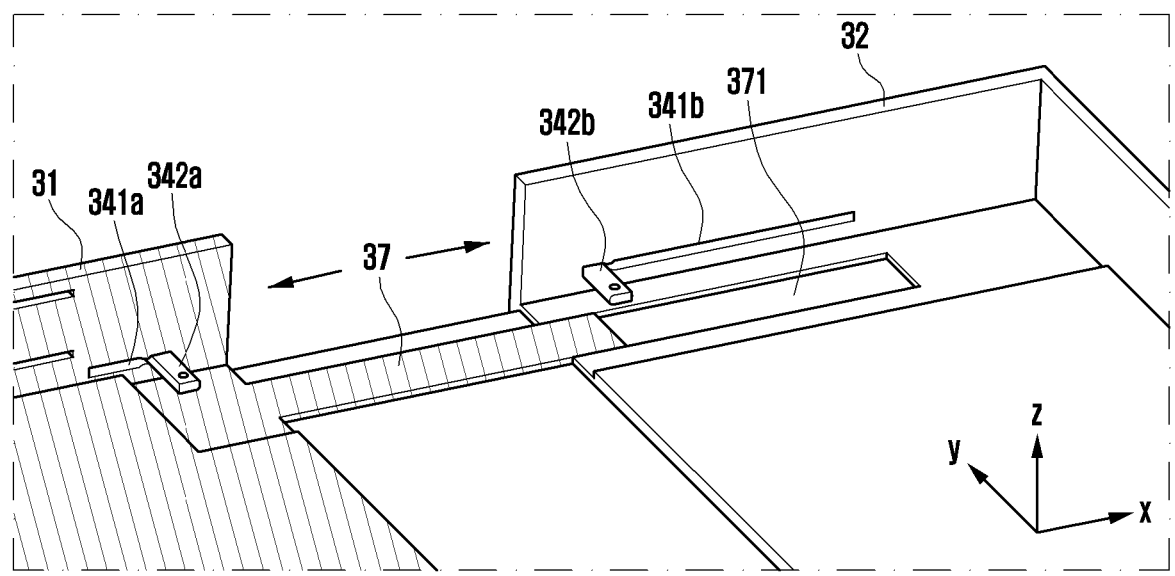
FIG. 10B is an internal perspective view illustrating a foreign material blocking member in a state in which a flexible display panel of an electronic device is drawn out according to an embodiment of the disclosure.

FIG. 10B is an internal perspective view illustrating a foreign material blocking member 37 in a state in which the flexible display panel 161 of the electronic device 101 is drawn out according to an embodiment of the disclosure.

Figure 10C:
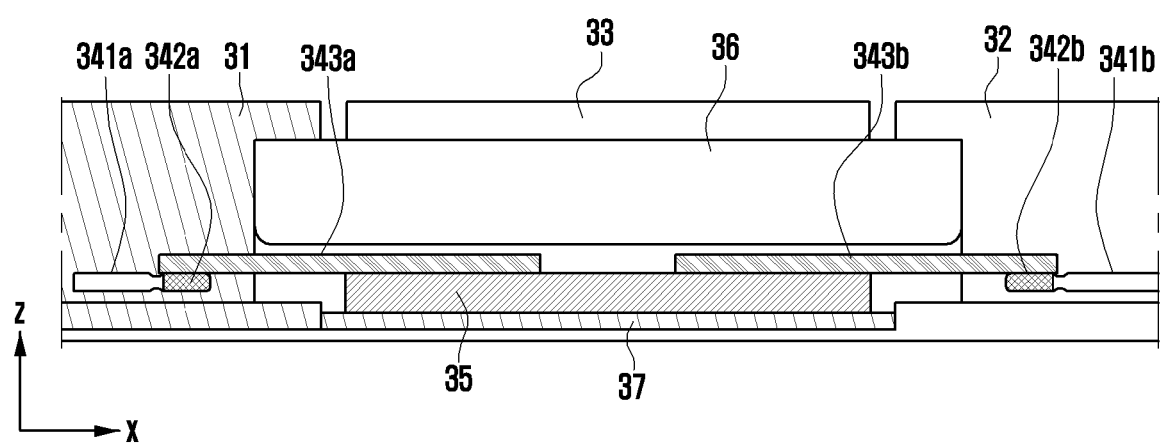
FIG. 10C is a side view illustrating a foreign material blocking member in a state in which a flexible display panel of an electronic device is drawn out and in which a protruding and retracting member is protruded according to an embodiment of the disclosure.

FIG. 10C is a side view illustrating a foreign material blocking member 37 in a state in which the flexible display panel 161 of the electronic device 101 is drawn out and in which a protruding and retracting member 33 is protruded according to an embodiment of the disclosure.

The side view of FIG. 10C is a side view taken based on the y-axis direction of FIG. 10B.

Referring to FIGS. 10A and 10B, the electronic device 101 according to another embodiment of the disclosure may include a foreign material blocking member 37.

The foreign material blocking member 37 may be fixedly coupled to either the first housing 31 or the second housing 32 and be slidable coupled to the other one of the first housing 31 or the second housing 32. In some embodiments of the disclosure, the other one of the first housing 31 or the second housing 32 may include a groove 371 formed at a bottom surface in order to guide the foreign material blocking member 37 during a sliding motion.

Referring to FIG. 10C, an upper surface (referring to a surface facing the z-axis direction in the drawing) of the foreign material blocking member 37 may slidably contact the guide 36 and the connecting member 35. The foreign material blocking member 37 may fill a gap existing between the guide 36 and the connecting member 35 and the first housing 31 or the second housing 32 to block an outer foreign material from being introduced into the electronic device 101 in a state in which the flexible display panel 161 is drawn out. In some embodiments of the disclosure, the foreign material blocking member 37 may be a seal, sweeper, or scraper including rubber, nitrile-butadiene rubber (NBR), silicone, or similar elastic materials.

According to various embodiments of the disclosure, an electronic device may include a first housing; a second housing slidably coupled to the first housing; a flexible display panel retracted into and drawn out from the electronic device by a sliding motion between the first housing and the second housing; a protruding and retracting member protruded to a space between lateral portions of the first housing and the second housing generated at a side surface of the flexible display panel or retracted into the electronic device from the space when the flexible display panel is drawn out or retracted; an interlocking structure coupled to at least one of the first housing or the second housing and configured to convert the sliding motion into a lateral movement of the electronic device; a connecting member having flexibility configured such that one end thereof is coupled to one end of the protruding and retracting member and the other end thereof is connected to the interlocking structure to be movable along the lateral movement; and a guide positioned in at least one of the first housing or the second housing and configured to convert the lateral movement of the connecting member generated by an action of the interlocking structure into a vertical movement. In some embodiments of the disclosure, the interlocking structure may include a sliding rail disposed on an inner side surface of at least one of the first housing or the second housing; a sliding block having one end portion slidably coupled to the sliding rail; and at least one link bar having one end portion rotatably coupled to the other end portion of the sliding block and the other end portion rotatably connected to the connecting member.

In some embodiments of the disclosure, the sliding rail may include a groove formed on an inner side surface of the first housing, and the guide may be fixedly disposed at the second housing at a lateral portion exposed to the outside during the withdrawing operation of the second housing. In another embodiment of the disclosure, the sliding rail may include a groove formed on an inner side surface of the second housing, and the guide may be fixedly disposed at the first housing at a lateral portion exposed to the outside during a withdrawing operation of the first housing. In another embodiment of the disclosure, the sliding rail may include a first sliding rail including a first groove formed on an inner side surface of the first housing and a second sliding rail including a second groove formed on an inner side surface of the second housing, the sliding block may include a first sliding block slidably coupled to the first sliding rail and a second sliding block slidably coupled to the second sliding rail, the link bar may include a first link bar having one end portion rotatably coupled to the other end portion of the first sliding block and the other end portion rotatably connected to the other end portion of the connecting member and a second link bar having one end portion rotatably coupled to the other end portion of the second sliding block and the other end portion rotatably connected to the other end portion of the connecting member, wherein the first link bar and the second link may be disposed to face each other based on a center line of the connecting member.

In another embodiment of the disclosure, the electronic device may further include a foreign material blocking member in contact with a lower part of the connecting member, slidably coupled on an inner surface of the first housing or the second housing, and configured to block a gap existing between the lower part of the connecting member and an inner surface of the first housing or the second housing to prevent a foreign material from being introduced into the electronic device.

In another embodiment of the disclosure, the sliding rail may include a sliding limiting member disposed close to an end portion in a direction in which the flexible display panel is retracted on a surface thereof and configured to apply a resistance force to a sliding movement therebetween with respect to the sliding block, and the sliding limiting member may have an asymmetrical resistance force that provides a low resistance force to a sliding movement of the sliding block when an operation of withdrawing the flexible display panel is performed and that provides a high resistance force to the sliding movement of the sliding block in an operation of retracting the flexible display panel.

In some embodiments of the disclosure, the connecting member may include a multi-bar structure including a plurality of bars disposed in parallel with each other and rotatably connected to each other. In another embodiment of the disclosure, the connecting member may have one side disposed parallel to the bar and the other side disposed at a specific angle with the one side on a plane, and the other side may have a flat connecting member rotatably connected to the other end portion of the link bar. In another embodiment of the disclosure, the sliding block may include a groove formed in the other end portion so that the one end portion of the link bar may be rotatably fitted, and the flat connecting member may include a groove formed to be rotatably fitted with the other end portion of the link bar at a distal end portion of the other side. In another embodiment of the disclosure, the connecting member may include a plurality of guide blocks formed at one side of each of the plurality of bars, and the guide may include a guide rail slidably coupled to the plurality of guide blocks. In some embodiments of the disclosure, the guide block may have a T-shaped cross-section, and the guide rail may have a cross-sectional shape corresponding to a cross-sectional shape of the guide block.

In some embodiments of the disclosure, the protruding and retracting member may be a side wall protecting a side surface of the flexible display panel. In another embodiment of the disclosure, the protruding and retracting member may include or be connected to a wireless transceiver, and the wireless transceiver included in or connected to the protruding and retracting member by a sliding motion may change a position thereof inside the electronic device or be exposed to a space between the first housing and the second housing to improve a wireless reception performance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing slidably coupled to the first housing;
a flexible display panel retracted into and drawn out from the electronic device by a sliding motion between the first housing and the second housing;
a protruding and retracting member protruded to a space between lateral portions of the first housing and the second housing generated at a side surface of the flexible display panel or retracted into the electronic device from the space when the flexible display panel is drawn out or retracted;
an interlocking structure coupled to at least one of the first housing or the second housing and configured to convert the sliding motion into a lateral movement of the electronic device;
a connecting member having flexibility configured such that one end thereof is coupled to one end of the protruding and retracting member and another end thereof is connected to the interlocking structure to be movable along the lateral movement; and
a guide positioned in at least one of the first housing or the second housing and configured to convert the lateral movement of the connecting member generated by an action of the interlocking structure into a vertical movement.

2. The electronic device of claim 1, wherein the interlocking structure comprises:
a sliding rail disposed on an inner side surface of at least one of the first housing or the second housing;

a sliding block having one end portion slidably coupled to the sliding rail; and at least one link bar having one end portion rotatably coupled to the other end portion of the sliding block and the other end portion rotatably connected to the connecting member.

3. The electronic device of claim 2, wherein the sliding rail comprises a groove formed on an inner side surface of the first housing, and wherein the guide is fixedly disposed at the second housing at a lateral portion exposed to the outside during a withdrawing operation of the second housing.

4. The electronic device of claim 2, wherein the sliding rail comprises a groove formed on an inner side surface of the second housing, and wherein the guide is fixedly disposed at the first housing at a lateral portion exposed to the outside during a withdrawing operation of the first housing.

5. The electronic device of claim 2, wherein the sliding rail comprises:

a first sliding rail including a first groove formed on an inner side surface of the first housing; and a second sliding rail including a second groove formed on an inner side surface of the second housing, wherein the sliding block comprises:

a first sliding block slidably coupled to the first sliding rail, and a second sliding block slidably coupled to the second sliding rail, wherein the link bar comprises:

a first link bar having one end portion rotatably coupled to the other end portion of the first sliding block and the other end portion rotatably connected to the other end portion of the connecting member, and a second link bar having one end portion rotatably coupled to the other end portion of the second sliding block and the other end portion rotatably connected to the other end portion of the connecting member, and wherein the first link bar and the second link are disposed to face each other based on a center line of the connecting member.

6. The electronic device of claim 5, further comprising a foreign material blocking member in contact with a lower part of the connecting member, slidably coupled on an inner surface of the first housing or the second housing, and configured to block a gap existing between the lower part of the connecting member and an inner surface of the first housing or the second housing to prevent a foreign material from being introduced into the electronic device.

7. The electronic device of claim 2, wherein the sliding rail comprises a sliding limiting member disposed close to an end portion in a direction in which the flexible display panel is retracted on a surface thereof and configured to apply a resistance force to a sliding movement therebetween with respect to the sliding block, and wherein the sliding limiting member has an asymmetrical resistance force that provides a low resistance force to a sliding movement of the sliding block when an operation of withdrawing the flexible display panel is performed and that provides a high resistance force to the sliding movement of the sliding block in an operation of retracting the flexible display panel.

8. The electronic device of claim 2, wherein the connecting member comprises a multi-bar structure including a plurality of bars disposed in parallel with each other and rotatably connected to each other.

9. The electronic device of claim 8, wherein the connecting member has one side disposed parallel to the plurality of bars and another side disposed at a specific angle with the one side on a plane, and wherein the other side has a flat connecting member rotatably connected to the other end portion of the link bar.

10. The electronic device of claim 9, wherein the sliding block comprises a groove formed in the other end portion so that the one end portion of the link bar may be rotatably fitted, and wherein the flat connecting member comprises a groove formed to be rotatably fitted with the other end portion of the link bar at a distal end portion of the other side.

11. The electronic device of claim 8, wherein the connecting member comprises a plurality of guide blocks formed at one side of each of the plurality of bars, and wherein the guide comprises a guide rail slidably coupled to the plurality of guide blocks.

12. The electronic device of claim 11, wherein the plurality of guide blocks has a T-shaped cross-section, and wherein the guide rail has a cross-sectional shape corresponding to a cross-sectional shape of the plurality of guide blocks.

13. The electronic device of claim 1, wherein the protruding and retracting member is a side wall protecting a side surface of the flexible display panel.

14. The electronic device of claim 1, wherein the protruding and retracting member comprises or is connected to a wireless transceiver, and wherein the wireless transceiver included in or connected to the protruding and retracting member by a sliding motion changes a position thereof inside the electronic device or is exposed to a space between the first housing and the second housing to improve a wireless reception performance.

* * * * *